United States Patent
Dulce et al.

(10) Patent No.: US 9,680,833 B2
(45) Date of Patent: Jun. 13, 2017

(54) DETECTION OF COMPROMISED UNMANAGED CLIENT END STATIONS USING SYNCHRONIZED TOKENS FROM ENTERPRISE-MANAGED CLIENT END STATIONS

(71) Applicant: Imperva, Inc., Redwood City, CA (US)

(72) Inventors: Sagie Dulce, Hod HaSharon (IL); Amichai Shulman, Tel Aviv (IL)

(73) Assignee: Imperva, Inc., Redwood City, CA (US)

( * ) Notice: Subject to any disclaimer, the term of this patent is extended or adjusted under 35 U.S.C. 154(b) by 40 days.

(21) Appl. No.: 14/750,539

(22) Filed: Jun. 25, 2015

(65) Prior Publication Data

US 2016/0381023 A1 Dec. 29, 2016

(51) Int. Cl.
*G06F 7/04* (2006.01)
*H04L 29/06* (2006.01)

(52) U.S. Cl.
CPC .......... *H04L 63/10* (2013.01); *H04L 63/1408* (2013.01); *H04L 63/1491* (2013.01)

(58) Field of Classification Search
None
See application file for complete search history.

(56) References Cited

U.S. PATENT DOCUMENTS

| 8,887,273 | B1 | 11/2014 | Satish et al. |
| 8,973,142 | B2 | 3/2015 | Shulman et al. |
| 2007/0271309 | A1* | 11/2007 | Witriol ............... H04L 67/1095 |
| 2012/0084866 | A1 | 4/2012 | Stolfo |
| 2015/0013006 | A1* | 1/2015 | Shulman ............. H04L 63/1416 726/23 |
| 2015/0135266 | A1 | 5/2015 | Shulman et al. |

* cited by examiner

*Primary Examiner* — Brandon Hoffman
(74) *Attorney, Agent, or Firm* — Nicholson De Vos Webster & Elliott, LLP

(57) ABSTRACT

Techniques related to detecting compromised unmanaged client end stations using synchronized tokens placed on enterprise-managed client end stations are described. A token distribution module causes token(s) to be placed with user data of a managed client end station in specific locations. The placement locations are selected due to the token(s) likely being synchronized, the token(s) being unlikely to be discovered or used by an authorized user, but likely discovered by an attacker. During a synchronization process, the token(s) are sent to an unmanaged client end station. The token(s) can be detected and/or acquired from the unmanaged client end station by an attacker, and thereafter used in an attempt to access an apparent enterprise resource. A token detection module can detect this use of the token(s) to thereby detect the compromise of the unmanaged client end station, without needing direct access to the unmanaged client end station.

20 Claims, 11 Drawing Sheets

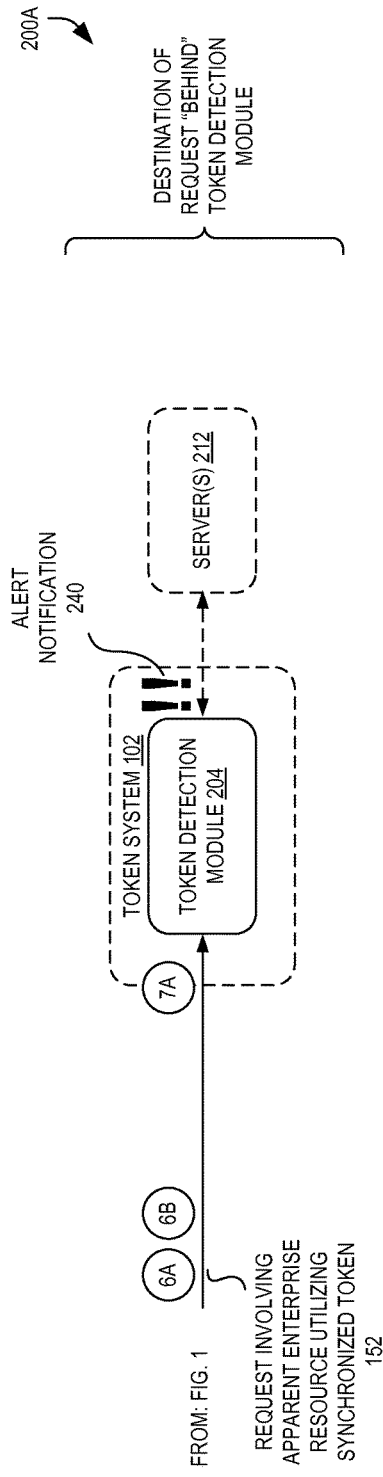
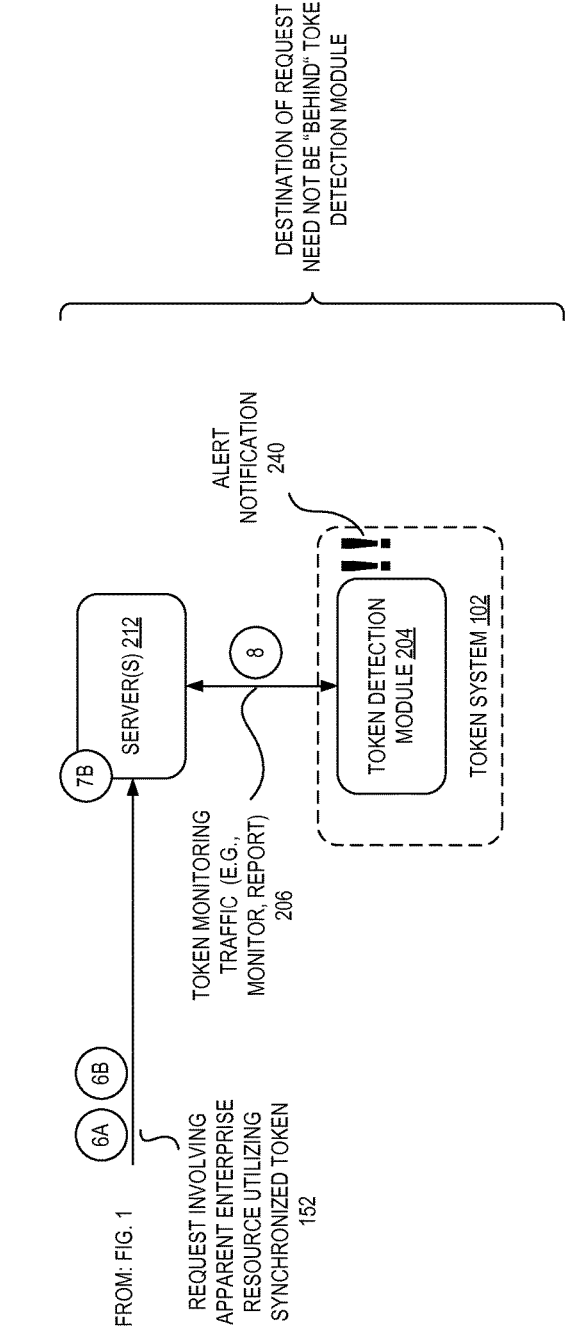
FIG. 2A
FIG. 2B

SOME TOKEN TYPES AND USER DATA PLACEMENT POSSIBILITIES 600

| USER DATA TYPES 602 | CREDENTIALS 654 | DATABASE METADATA (E.G., TABLE/DB NAME) 656 | RESOURCE IDENTIFIER (E.G., URL, PATH, SPN) 658 | EMAIL ADDRESS 660 |
|---|---|---|---|---|
| EMAIL MESSAGE 329A | ✓ | ✓ | ✓ | ✓ |
| MEETING 329B | ✓ | ✓ | ✓ | ✓ |
| CONTACT 329C | ✓ | ✓ |  | ✓ |
| NOTE / FILE 329D | ✓ |  | ✓ | ✓ |
| BROWSER HISTORY 329E |  |  | ✓ |  |
| CREDENTIAL STORE 329F |  |  | ✓ | ✓ |
| FAVORITES 329G |  |  |  |  |

SOME TOKEN TYPES 604

FIG. 6

SOME USER DATA PLACEMENT POSSIBILITIES 700

| USER DATA TYPES 602 | TRASH / MARK AS DELETED 750 | "HIDDEN IN PLAIN SIGHT" 752 | | HIDDEN FOLDER 756 |
|---|---|---|---|---|
| | | | SET WITH "OLD" DATE/TIME 754 | |
| EMAIL MESSAGE 329A | ✓ | | ✓ | ✓ |
| MEETING 329B | ✓ | | ✓ | ✓ |
| CONTACT 329C | ✓ | ✓ | | ✓ |
| NOTE / FILE 329D | | ✓ | ✓ | ✓ |
| BROWSER HISTORY 329E | | ✓ | | |
| CREDENTIAL STORE 329F | | ✓ | | |
| FAVORITES 329G | | | | |

SOME PLACEMENTS 702

FIG. 7

DETECTION OF COMPROMISED UNMANAGED CLIENT END STATIONS USING SYNCHRONIZED TOKENS FROM ENTERPRISE-MANAGED CLIENT END STATIONS

FIELD

Embodiments of the invention relate to the field of computer networking; and more specifically, to detecting compromised unmanaged client end stations using synchronized tokens from enterprise-managed client end stations.

BACKGROUND

The use of honeypots and honey tokens is fairly widespread in the field of network security. The term honeypot is commonly used to refer to a trap set to detect, deflect, or counteract attempts at an unauthorized use or malicious use of information systems. Generally, a honeypot can be a decoy server or end station that appears to be part of a network, but is actually isolated and monitored, and which appears to contain information or a resource of value to attackers. Honeypots allow system operators to learn how attackers probe and attempt to gain access to end stations, and can also be used to gather evidence to be used to assist in the apprehension or prosecution of attackers.

Similarly, the term "honey token" (or honeytoken) can be used to refer to honeypots that are not servers or end stations. Instead, honey tokens are typically pieces of information placed within a server or server end station that are typically easy to detect when used, but rarely (if ever) used by an authorized user. For example, a honey token could be a user account that is not actually assigned to or used by any authorized user, or a database entry that would typically only be selected by a malicious query. Accordingly, a security compromise (i.e., a data breach) can be identified when a honey token is detected as being used. For example, upon an attempted or actual use of the user account honey token (e.g., an attempt to log on to a server), or an attempted or actual access of the database entry including a honey token, an alarm can be issued to indicate the compromise.

However, as organizations have begun providing mobile end stations and/or allowing employee-owned mobile end stations (such as cellular phones or tablet computers) to be used for organizational business, the resultant mobility of such mobile end stations has led to further security vulnerabilities for the enterprise. For example, individuals often lose personal or enterprise-provided mobile phones, thereby exposing organizational resources (e.g., email, documents, credentials) to be exploited by an attacker. Such scenarios can be especially problematic when a lost or compromised mobile end station is not managed by the enterprise—such as a personal cell phone of an employee—as the organization may not have the ability to control/protect/secure the end station or resources available thereon. Additionally, because unmanaged end stations are not under the control or watch of the enterprise, a one-time or continual compromise of an unmanaged client end station (e.g., via installed malware) may not even be detected by the user or enterprise, thus weakening the enterprise's ability to protect its resources. Accordingly, illegal data access originating from compromised end stations have become one of the most prominent information threats that organizations face today.

Accordingly, improved techniques for enhancing an organization's security, especially with regard to unmanaged client end stations such as mobile devices, are desired.

BRIEF DESCRIPTION OF THE DRAWINGS

The invention may best be understood by referring to the following description and accompanying drawings that are used to illustrate embodiments of the invention. In the drawings:

FIG. 2A is a block diagram illustrating an inline token detection module deployment for detecting compromised unmanaged client end stations using tokens placed with synchronized user data on enterprise-managed client end stations according to some embodiments.

FIG. 2B is a block diagram illustrating a non-inline token detection module deployment for detecting compromised unmanaged client end stations using tokens placed with synchronized user data on enterprise-managed client end stations according to some embodiments.

FIG. 6 is a diagram illustrating some token types and user data placement possibilities according to some embodiments.

FIG. 7 is a diagram illustrating some user data types and placement possibilities according to some embodiments.

DESCRIPTION OF EMBODIMENTS

Figure 1:
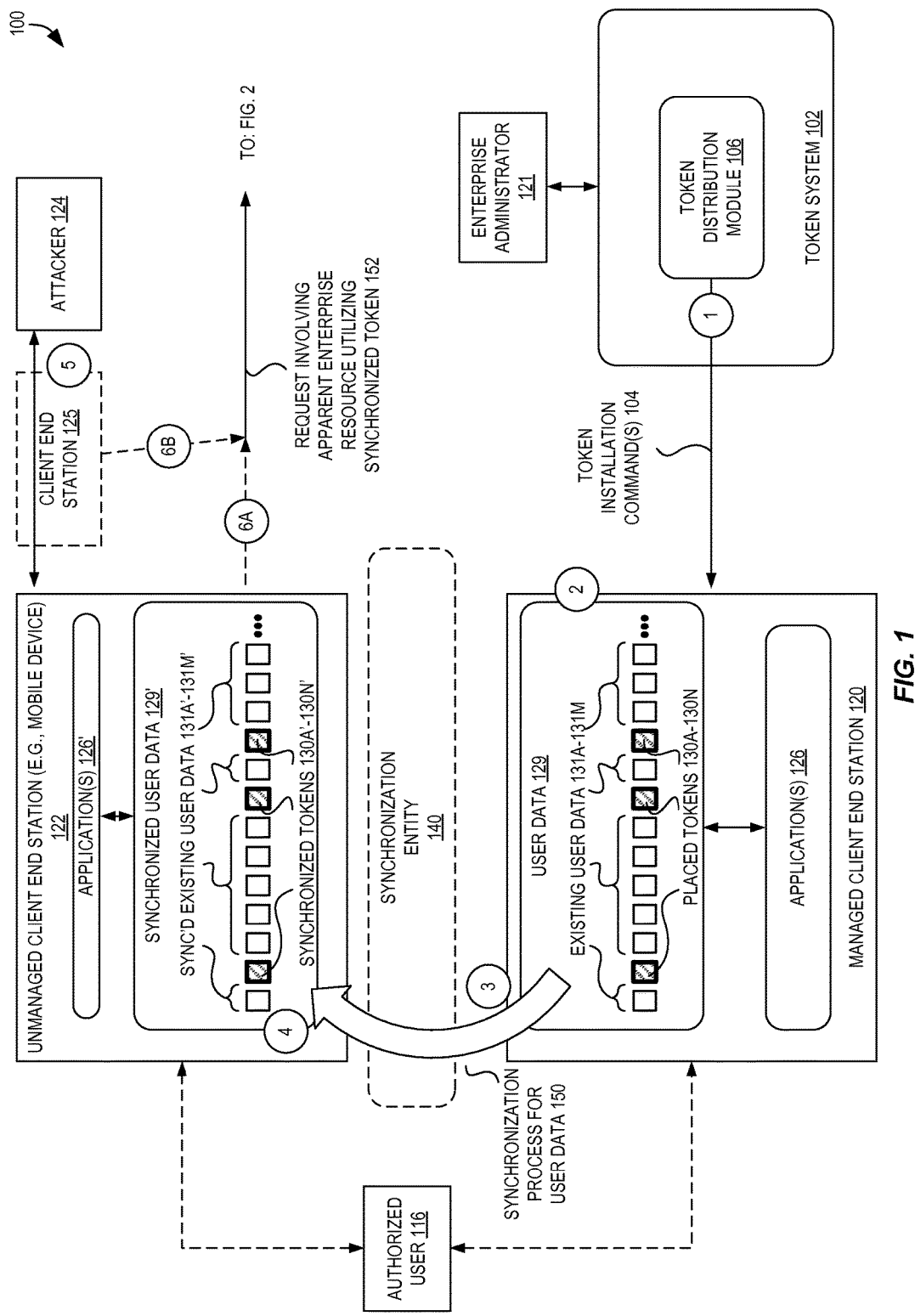
FIG. 1 is a block diagram illustrating the placement of tokens with synchronized user data on enterprise-managed client end stations to enable the detection of compromised unmanaged client end stations using according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms may be used interchangeably herein to refer to a URI, which is a string of characters used to identify a resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware.

Embodiments of the invention relate to the field of computer networking; and more specifically, to compromised unmanaged client end station detection using synchronized tokens from enterprise-managed client end stations.

In some embodiments, a token distribution module of a token system causes one or more tokens to be placed with synchronized user data of a managed client end station. During a synchronization process, the one or more tokens will be sent to an unmanaged client end station. At least one of the one or more tokens can be detected and/or acquired from the unmanaged client end station by an attacker, and thereafter used in an attempt to access an apparent enterprise resource. The enterprise resource can be "apparent" as it may or may not actually exist. A token detection module of the token system can detect this use of the token to thereby detect the compromise of the unmanaged client end station.

In some embodiments, the tokens are "reverse honey tokens." A "reverse" honey token, unlike a traditional honey token, is not placed (or does not exist) within a server or server end station. Instead, reverse honey tokens can be placed in client end stations at locations such that the reverse honey tokens are not easily or typically found or utilized by authorized end users of the client end stations. The reverse honey tokens can have an apparent use at a server that is typically not hosted by or co-located with that client end station. In some embodiments, the revere honey tokens are not even known by a server where those tokens have an apparent use, and thus can be treated as "invalid" by those servers. This can provide a benefit in that the servers need not be informed of what reverse honey tokens exist, and even if an attacker discovers and attempts to use a reverse honey token, it will not allow the attacker any access to the server due to its invalidity.

In some embodiments, the tokens are placed with or within legitimate user data (of managed client end stations) in particular locations selected because of the data being likely to be synchronized. In some embodiments, these token placement locations can also be, in effect, hidden or secluded away from authorized users such that an authorized user is extremely unlikely to detect their presence or attempt to utilize them, but still be located such that an attacker is likely to detect them. These three traits can together be referred to herein as "optimal token placement criteria": that token is placed such that it is likely to be synchronized, not likely to be detected or modified by an authorized user, but likely to be detected by a malicious user/attacker.

For example, in some embodiments the tokens can be placed within "deleted items" locations (e.g., a trash bin, a trash folder, a deleted items folder, etc.), placed within "hidden" locations (e.g., hidden folders), configured with an "old" date and/or time metadata, and/or placed directly alongside legitimate user data such that it is "hidden in plain sight."

According to some embodiments, by detecting the use of a token, an unmanaged client end station can be detected by an enterprise as being compromised, despite the enterprise potentially not having access to or control over the unmanaged client end station. Upon this detection, in some embodiments, network traffic from the end station attempting to utilize the token (and/or the compromised client end station) can be monitored, regulated, and/or blocked.

In some embodiments, the detected token can be used to identify the managed client end station where the token was originally placed. In some embodiments the authorized user of the managed end station can be identified, and accounts and/or credentials of the authorized user of the associated managed client end station can be placed under heightened scrutiny, suspended/locked/deleted, etc.

The token detection module can be deployed in a variety of environments. For example, the token detection module can be deployed within an enterprise security gateway deployed on-premise with one or more enterprise resources. In some embodiments, traffic directed toward at least some of the one or more enterprise resources passes to/through the enterprise security gateway. For example, the enterprise security gateway may be located in a "choke point" such that traffic destined for the one or more enterprise resources must flow through the enterprise security gateway. Thus, the token detection module can thus detect a use of the token in network traffic directed toward the enterprise resources. This traffic may or may not be passed on to reach the enterprise resources. The use of the token may originate inside or outside the enterprise network, and may be transmitted by the unmanaged client end station or another attacker-controlled client end station.

In some embodiments, the token detection module can be deployed in a cloud security gateway of a cloud computing system. The cloud security gateway can be configured to provide access to enterprise resources provided/hosted by another cloud computing system (e.g., of a third-party entity) or by the same cloud computing system. In some embodiments, legitimate users of the enterprise access the enterprise resources via the cloud security gateway, and similarly an attacker may attempt to access the enterprise resources through the same path via the cloud security gateway. Accordingly, in some embodiments the token detection module can detect the use of the token (gained from a compromise of an unmanaged client end station) directly within network traffic.

Further, in some embodiments, the token detection module can be deployed within a global monitor module executed by a server end station. The global monitor module can be configured to interact with enterprise resources or servers providing enterprise resources to detect a use of a token. Thus, in some embodiments, the global monitor module can detect a use of a token without needing to directly observe the network traffic constituting the attempted use of the token. In some embodiments, the token detection module can poll another system (e.g., periodically send requests) to determine whether a token has been used in an attempt to access an apparent enterprise resource. In some embodiments, the token detection module can receive a report initiated by a server that indicates an attempted use of the token as observed by the server.

Accordingly, embodiments utilizing tokens placed with synchronized user data on enterprise-managed client end stations, in contrast to most typical network security measures, can detect compromised unmanaged client end stations used by enterprise users. In various embodiments, these techniques can be easily deployed, create only a minimum or no risk to real enterprise data, provide an extremely low false positive rate, and can be used as effective defensive measure. Further, these embodiments do not confuse or disrupt the authorized user's use of either the managed or unmanaged client end stations.

FIG. 1 is a block diagram 100 illustrating the placement of tokens 130 with synchronized user data 129 on enterprise-managed client end stations 120 to enable the detection of compromised unmanaged client end stations 122 according to some embodiments.

As illustrated, FIG. 1 includes a managed client end station 120 and an unmanaged client end station 122 of an authorized user 116. Each of these client end stations can be a computing device operable to execute one or more applications 126 or 126'. There are a wide variety of types of client end stations, including but not limited to workstations/PCs, laptops, netbooks, mobile phones, smartphones, multimedia phones, smart watches, Voice Over Internet Protocol (VOIP) phones, user equipment (UE), terminals, portable media players, Global Positioning System (GPS) units, gaming systems, wearable computing devices, set-top boxes, etc.

However, the managed client end station 120 differs from the unmanaged client end station 122 in that it is under the control of an enterprise. For example, the managed client end station 120 can be configured to allow the enterprise (e.g., at the request/control of an enterprise administrator 121) to update its files or settings, cause it to execute particular applications or commands, etc. For example, the authorized user 116 can be an employee of an enterprise, and assigned the managed client end station 120 (e.g., a desktop computer, a mobile phone, etc.) for use by the authorized user 116 for work-related tasks, where the managed client end station 120 may be monitored and/or managed by the enterprise.

In contrast, the unmanaged client end station 122—which may or may not be privately owned by the authorized user 116—is not under the control of the enterprise. For example, the unmanaged client end station 122 could be a personal computer, mobile phone, tablet, etc., owned by the authorized user 116 and used for personal use. Alternatively, the unmanaged client end station 122 could be owned by a friend or family member of the authorized user 116. The unmanaged client end station 122 could, however, have access to enterprise resources, such as by utilizing an email client application to access an enterprise email account of the authorized user 116.

Those of ordinary skill will recognize that there are many different technical ways to achieve the described "managed" configuration of client end stations. However, for the purposes of this disclosure, we assume that the managed client end station 120 is configured according to any one of a number of different possible techniques to allow an enterprise to cause its data to be modified—e.g., place a token upon the managed client end station 120.

At circle '1' of the illustrated embodiment, a token distribution module 106 of a token system 102 can be configured or instructed (e.g., by an enterprise administrator 121) to transmit one or more token installation commands 104 to the managed client end station 120 to cause one or more tokens 130A-130N to be placed with existing user data 131A-131M of user data 129.

The tokens 130A-130N can be "reverse honey tokens" of any of a number of different types of information and, in some embodiments, are not legitimate or valid and thus cannot actually be used to access any enterprise data. In various embodiments, the tokens 130A-130N can be of any number of types including, but not limited to, one or more of a username, a password, a network address (such as an Internet Protocol (IP) address of a server), a filename or file identifier, a directory name, a file system path, a URL or URI, a port number, a machine/host name, a database name, a table name, a database column name, a database query, a database connection string, details describing a protocol, an encryption key, a hash function name or algorithm, data representing an answer for a security question, a program name, a telephone number, a cookie value of a Hypertext Transfer Protocol (HTTP) cookie, or another type of information that seemingly could be used to access enterprise resources and that is not trivial to guess or obtain.

In some embodiments, the token system 102 can include a token generation module (not illustrated) configured to generate tokens according to token generation logic, which are provided to the token distribution module 106. The token generation logic can determine which types of token are to be generated based upon, for example, determining a type of the managed client end station 120 and/or types of applications 126 or types of user data 129 known to exist or be utilized by the managed client end station 120, etc.

When a token is to be generated for a managed client end station 120, the token generation logic can execute to identify a particular client application 126 used by the managed client end station 120, identify one or more user data types associated with (e.g., utilized by or with) the client application 126 that are known as being likely to be synchronized (i.e., determine a user data placement possibility for the token), and identify one or more token types that are configured as able to be placed using the identified user data types. For example, the token generation logic could identify that an email client application 126 (e.g., Microsoft® Outlook®) is utilized by the managed client end station 120, identify "email messages", "meeting objects", etc., as user data types associated with the email client application 126 that are likely to be synchronized, and identify one or more token types (e.g., credentials, resource identifier, etc.) as useful for placement within those particular data types. The token generation logic can thus generate one or more tokens for these one or more identified token types. Further detail regarding the generation of tokens and determination of placement locations will be described later herein with regard to FIGS. 6-7.

Thus, in some embodiments, the one or more tokens 130A-130N can be generated or acquired by the token system 102 and transmitted in some format (e.g., encrypted, compressed, etc.) via token installation command(s) 104.

In some embodiments, the token distribution module 106 includes a server module to generate and distribute Windows® Active Directory Group Policy Objects (GPO)—as the token installation commands 104—including the tokens, which are pushed out to the managed client end station 120A (e.g., during a login or logout of the authorized user's 116 account, or at some other point). For example, a GPO may comprise a script that, when pushed to and executed by a managed client end station 120, places one or more tokens 130A-130N within existing user data 131A-131M or within completely new "generated" user data which will include the tokens. As another example, the token installation command(s) 104 could be a script such as a VBScript, etc., including instructions to create/read/update/delete files or other data structures to generate user data objects (e.g., email messages, files, contact objects, etc.) including the tokens. In some embodiments, other distribution modules of the token system 102 used for token installation may include a Microsoft® System Center Configuration Manager (SCCM) component, an IBM® Tivoli® component, or another enterprise end station management software package.

In other embodiments, the token distribution module 106 is configured to transmit portions of tokens or complete tokens to the managed client end station 120 (e.g., using a Secure Copy (SCP) program, Telnet, File Transfer Protocol (FTP), WinSCP, etc.), and in some embodiments the managed client end station 120 can be configured to proactively connect to the token distribution module 106 to retrieve tokens 130A-130N.

Additionally, in some embodiments the token system 102 can maintain a token distribution scheme, which includes causing a redistribution of the tokens 130A-130N according to a schedule, which ensures the availability/existence of tokens 130A-130N on the managed client end station 120, as the earlier tokens 130A-130N could have been moved, modified, or deleted by the authorized user 116. In some embodiments, this maintenance includes causing a distribution of additional and/or replacement tokens 130A-130N that are different than the earlier-placed tokens 130A-130N.

In some embodiments, the token system 102 maintains a record of the dates/times that each token was placed on the managed client end station 120. Then, upon later detecting a use of a synchronized token 130A', the token system 102 can determine one or both of which managed client end station (e.g., 120) was compromised, as well as the approximate time (or range of times) of the compromise. This information—the identity of the managed client end station 120, and the approximate time or range of times of compromise—can be stored by the token system 102 and/or reported to one or more users via a display and/or electronic message (e.g., e-mail, Short Message Service (SMS) message, instant message, etc.), enhancing any forensic investigation into the details surrounding the compromise.

At circle '2', the one or more tokens 130A-130N are placed (now referred to herein as "placed tokens 130A-130N", etc.) with user data 129 amongst other existing user data 131A-131M. According to some embodiments, the one or more tokens 130A-130N are specifically placed in particular user data 129 locations that are likely to be synchronized with other devices. Many types of user data are well-known as commonly being synchronized, and thus the selection of these locations is purposeful and will be further detailed later herein.

At circle '3' the user data 129 is synchronized via a synchronization process 150 to cause the user data 129—including the placed tokens 130A-130N—to be duplicated at an unmanaged client end station 122 as synchronized user data 129' and synchronized tokens 130A'-130M' at circle '4'.

The synchronization process 150 can occur in multiple ways, including sending some or all of the user data 129 (e.g., only changed user data, such as newly-placed or modified tokens 130A-130N) to a server end station of the synchronization entity 140, which can be configured to send this data to the unmanaged client end station 122 at some point in time.

In some embodiments, the synchronization entity 140 can be the enterprise itself. For example, in one embodiment a token 130A could be placed with a data object (e.g., an email message, a contact, etc.) of a communications application, and the synchronization process 150 can include the managed client end station 120 transmitting the token 130A to a communications server (e.g., a mail server) of the enterprise, which at that time or a later time can transmit the token 130A to the unmanaged client end station 122 and thus become synchronized token 130A'.

In some embodiments, the synchronization entity 140 can be a third-party that is not the enterprise. For example, the synchronization entity 140 can be a provider of a cloud-based service, such as communications software, cloud storage, etc. Additionally, in some embodiments the synchronization entity 140 need not exist whatsoever—instead, the managed client end station 120 can be configured to "directly" (e.g., through some type of peer-to-peer communication, possibly involving only the two client end stations, but possibly including other network devices such as routers, switches, etc.) perform the synchronization process 150 by sending some or all of the user data 129 to the unmanaged client end station 122 to become synchronized user data 129'.

The synchronization process 150 can be "smart" or "dumb," meaning that varying levels of logic can be implemented to reduce the amount of data needing to be transmitted during the synchronization. For example, in some embodiments the synchronization process 150 is a "smart" process that determines which portions of the user data 129 have been changed (and thus detects newly placed tokens 130A-130N), and only causes this "changed" data to be synchronized. For example, the synchronization process 150 can include keeping track of changes made to the user data 129 (e.g., detect the creation of new files or changes to files), and only synchronizing that data. In some embodiments, the synchronization process 150 can utilize digest-based algorithms (e.g., computing and comparing hash values) to determine whether portions of user data 129 and synchronized user data 129' are equivalent. However, in some embodiments, the synchronization process 150 can be "dumb" and transmit more than just the recently-changed (e.g., since a last synchronization process 150) user data 129 during the synchronization process 150. For example, the synchronization process 150 can be configured to simply transmit all user data 129 of a certain type or categorization (e.g., all files in a directory) from the managed client end station 120, and cause all of this user data 129 to be placed as synchronized user data 129'.

The synchronization process 150 can also, in some embodiments, include multiple stages that can occur within a short amount of time (e.g., milliseconds, seconds) or be separated by larger amounts of time (e.g., minutes, hours, days). For example, in some embodiments a transmission of the placed tokens 130A-130N from the managed client end station 120 to the synchronization entity 140 can occur at a first point in time, and then the transmission of the tokens 130A-130N from the synchronization entity 140 to the unmanaged client end station 122 can occur at a second point in time, such as when a particular application 126 or application subroutine (e.g., a "check mail" routine, a synchronize routine) is executed by the unmanaged client end station 122.

At some point—either before or after the synchronization process 150 has caused the tokens 130A-130N to be placed as synchronized tokens 103A'-130N'—the unmanaged client end station 122 is compromised (at circle '5') by an attacker 124. The compromise can occur in a variety of ways. In some instances, the attacker 124 may have direct, physical access to the unmanaged client end station 122, but in other instances, the attacker 124 may be able to connect to the unmanaged client end station 122 from a separate client end station 125.

For example, the attacker 124 may simply gain possession of the unmanaged client end station 122, and directly interact with the unmanaged client end station 122. As another example, the attacker 124 may be granted access to the unmanaged client end station 122 when an authorized user 116 accesses a malicious webpage (via the unmanaged client end station 122) causing a malicious program or code (i.e., "malware") to be executed by the client end station 122. For example, the authorized user 116, using a web browser of the client end station 122, may load a web page hosting an "exploit kit" that subjects the client end station 122 to one or more attacks (attempting to install malware) against the web browser or other software that the web browser can invoke, such as a third party document viewer or multimedia player.

With access to the compromised unmanaged client end station 122, the attacker 124 may then find one or more of the one or more synchronized tokens 130A'-130N'. The attacker 124 may discover these synchronized tokens 130A'-130N' by purposefully looking for information that could provide the attacker 124 access to sensitive/valuable resources. For example, the attacker 124 may perform searches through a variety of locations known for having stored user credentials (e.g., usernames, passwords, keys/certificates) for accessing resources, resource location identifiers (e.g., URLs, file system paths), etc.

Due to the specific placement of the placed tokens 130A-130N in locations that are both not typically used/found by authorized users but would still be likely be discovered by attackers, the attacker 124 will likely gain access to the synchronized tokens 130A'-130N', which appear to provide access to enterprise (or non-enterprise) resources.

The attacker 124 may then attempt to utilize one or more of the synchronized tokens 130A'-130N' to gain access to enterprise resources. This can occur, for example, at circle '6A' where the attacker 124 causes the unmanaged client end station 122 to transmit a request 152 involving an apparent enterprise resource that utilizes/includes one or more of the synchronized tokens 103A'-130N'. Alternatively, the attacker 124 could utilize a separate client end station 125 at circle '6B' to transmit the request 152. This request 152 can be made up of one or more packets including one or more of the synchronized tokens 130A'-130N'.

A synchronized token (e.g., 130A') may be used as a part of a set of packet headers used to transport a payload, or may be carried by the payload itself. For example, a synchronized token 130A' could be an illegitimate IP address for an apparent web application server, and thus the illegitimate IP address could appear in a destination IP address field of an IP header of the packets. As another example, a synchronized token 130A' could be a name of an invalid database table; thus, the name of the invalid database table could exist within a database query (e.g., a Structured Query Language (SQL) query) carried by a payload of the set of packets making up the request 152.

The request 152 can transport packet payloads adhering to a protocol for interacting with one or more apparent servers (which need not actually exist). For example, if the synchronized token 130A' comprises information that appears to provide information useful for accessing a file server, the set of packets can carry payloads following a protocol such as the Server Message Block (SMB) protocol or the Common Internet File System (CIFS) protocol. Similarly, the packets may carry information adhering to other data access protocols, including but not limited to HTTP, Telnet, FTP, Simple Mail Transfer Protocol (SMTP), Internet Message Access Protocol (IMAP), Post Office Protocol (POP), Simple Network Management Protocol (SNMP), Network File System (NFS), etc.

Thus, the request 152 can utilize a synchronized token (e.g., 130A') in a variety of different ways depending upon the type of protocol(s) involved and the type of the apparent enterprise resource involved.

As another example, in some embodiments the synchronized token 130A' can comprise a URL of an apparent enterprise resource, and thus, the request 152 could comprise a Domain Name System (DNS) query seeking to resolve an IP address for a hostname portion of the URL. Accordingly, the request 152 can thus "utilize" a synchronized token 130A' by being based upon the token (e.g., include a portion or subset of the token), and does not need to necessarily include all of the token, although it can. As another example, if the synchronized token 130A' is a URL, the request 152 could be an HTTP request including a path of the URL, parameters of the URL, etc., but perhaps not the complete URL itself. Further, although the synchronized token 130A' could be a URL, the request 152 could include an IP address associated with the URL but not the actual URL itself—however, the request 152 is still "utilizing" the synchronized token, albeit in a derivative form (i.e., the IP address equivalent).

Further, the synchronized token 130A' could comprise a credential appearing to be useful to provide access to an apparent enterprise resource, and can be one or more of a username, password, security hint answer, encryption key, etc. Accordingly, the request 152 can include the credential itself (e.g., a username), or can include a transformed version of the credential (e.g., a hashed version of a username), etc.

Following the request 152, we turn to FIG. 2A, which is a block diagram 200A illustrating an "inline" token detection module deployment for detecting compromised unmanaged client end stations using tokens placed with synchronized user data on enterprise-managed client end stations according to some embodiments. In this illustrated deployment, a token detection module 204, which is part of the token system 102, receives the request 152 involving an apparent enterprise resource utilizing a synchronized token, which was transmitted at either circle '6A' from the unmanaged client end station 122 or at circle '6B' from another client end station 125 in FIG. 1. The token detection module 204, at circle '7A', can then analyze the request 152 according to one or more security rules to detect the use of the synchronized token, and thus, the compromise of the unmanaged client end station 122.

In some embodiments, the request 152 may be destined to an actual server 212 application configured to process particular types of requests, such as a web server that services HTTP requests. Accordingly, in some embodiments, the server 212 can be located "behind" the token detection module 204 and thus the request 152 must pass through the token detection module 204 prior to being able to arrive at the server 212. Thus, the token detection module 204 can be optionally configured to prevent the request 152 from ever reaching the server 212. However, in some embodiments an actual server 212 need not exist, and thus the request 152 may be destined for an "apparent" enterprise resource that does not exist, which can further increase the security of the system as no actual enterprise resources are at risk.

As introduced above, the token detection module 204 can be configured with one or more security rules that are used to analyze arriving traffic to detect the presence of a synchronized token (or a derivation thereof—i.e., data based upon a synchronized token, such as an IP address based upon a resource identifier and acquired from a DNS lookup, for example, or a decrypted token). Thus, the token detection module 204 can be configured to detect particular tokens, portions of tokens, token derivations, etc., in particular types of network traffic based upon the associated apparent enterprise resource associated with the particular token.

As one example, the token detection module 204 can be configured with a security rule indicating that, when certain traffic (e.g., HTTP message traffic) is received having a particular value (e.g., a particular synchronized token 130A' or derivation, perhaps located within a particular header field or payload), the token detection module 204 will cause an alert notification 240 to be generated.

The generated alert notification 240 can comprise, depending upon the particular embodiment, one or more actions including but not limited to blocking the set of packets (of the request 152) by not forwarding them on to the destination server(s) 212 (i.e., dropping the packets), which can be straightforwardly implemented when the token detection module 204 is configured inline between the requesting client end station(s) and the server(s) 212. The one or more actions of the generated alert 240 can also comprise sending a notification message to an administrative user or other user describing the receipt of the synchronized token (e.g., 130A'), sending a notification message to one or more security gateways, which may enable those recipients to implement further security protections against the user of the synchronized token 130A'. In some embodiments, the one or more actions of the generated alert 240 may comprise one or more of transmitting an error message back toward the requesting client end station, and/or transmitting a "fake" or "trick" server response that appears valid. Moreover, in some embodiments, the one or more actions of the generated alert 240 may comprise implementing a security rule to place all future traffic received from the source of the request 152 under heightened scrutiny (e.g., closely monitor all traffic from an IP address of the sender), and/or implementing a security rule to place all traffic of a particular database user under heightened scrutiny (when, for example, the synchronized and observed token 130A' is a database table name).

As another example pertaining to synchronized token detection, the token detection module 204 can be configured to monitor network traffic for an attempted use of a token by: looking for a database login attempt using a database user name within a list of known token database user names, looking for a database "USE" command (i.e., a command to select a particular database to be used) seeking to utilize a database name included within a list of known token database names, looking for a database query utilizing a table name existing in a list of known token database table names, looking for an attempted access (e.g., CIFS, NFS, Sharepoint access) to a file or directory/folder having a filename, directory name, or path in a list of known (or derivable) token resource identifiers (e.g., filenames, directory names, paths), looking for HTTP messages containing web application authentication credentials including a username and/or password that are known to be (or can be determined to be) tokens, and/or looking for HTTP messages seeking to access a particular URL or URI that is known (or can be determined to be) a token resource identifier. Of course, these examples represent only a few detection schemes for detecting the use of tokens, and many other detection schemes are enabled through embodiments of the invention.

The token detection module 204 can be deployed in a variety of ways. For example, in the embodiments depicted in FIG. 9 and FIG. 10, the token detection module 204 can be implemented in a security gateway. As another example, in the embodiment depicted in FIG. 11 the token detection module 204 can be implemented in a global monitor module. Further detail describing these implementations will be provided later with regard to these figures.

FIG. 2B presents an alternative configuration in the form of a block diagram 200B illustrating a non-inline token detection module deployment. In this example, the request 152 (transmitted at either circle '6A' or circle '6B') involving the apparent enterprise resource utilizing the synchronized token actually arrives, at circle '7B', at the one or more servers 212. Then, as illustrated at circle '8', the token detection module 204 can be configured to detect the use of the synchronized token via token monitoring traffic 206 transmitted between the token detection module 204 and the server(s) 212. Accordingly, in this deployment, the destination of the request 152 (e.g., server(s) 212) is not "behind" the token detection module 204, as the request 152 traffic does not need to pass through the token detection module 204 to get to the servers) 212.

In some embodiments, the token detection module 204 can be configured to "monitor" or "poll" by transmitting requests to the server(s) 212 as part of token monitoring traffic 206 to determine whether the server(s) 212 have received a request 152 utilizing a synchronized token. This monitoring can occur according to a defined schedule, such as checking once every few minutes.

For example, a synchronized token 130A' may comprise an email address (or credentials for an email account), and the token detection module 204 could be configured to interact with a server 212 (e.g., log into the account, issue an API call, etc.) that provides service for the email address to detect a use of the synchronized token, such as an email being sent to the account or another entity attempting to log into (or otherwise utilize) the account. As another example, a synchronized token 130A' may comprise a URL for an apparent shared document, and the token detection module 204 could be configured to interact with a server 212 hosting the shared document to detect an access to the shared document by, for example, viewing an access log to identify accesses to the document. Of course, the document could be populated with purposefully incorrect data, etc., for the sake of security.

In some embodiments, the server(s) 212 can be configured to "report" receipt of some requests (e.g., those requests involving the apparent enterprise resource or involving a synchronized token) to the token detection module 204 as token monitoring traffic 206. For example, in some embodiments the server(s) 212 can be configured to transmit reporting data to the token detection module 204 using an API call, SMS message, email message, etc., upon receipt of a request 152. Based upon this reporting data from the server(s) 212, the token detection module 204 can utilize one or more security rules to determine whether a synchronized token 130A' was utilized.

As one example, a server 212 can be configured to report every request it receives for a particular resource or set of resources to the token detection module 204. The report can include data indicating a time of the request, what data the request included—possibly including header values (such as source IP addresses, for example), what enterprise resource (s) the request was associated with (i.e., what resource the request-sending entity was attempting to access), etc. Thus, the token detection module 204 can be configured with a security rule indicating that when any reported message (as part of token monitoring traffic 206) is received from a particular server 212 involving a particular resource (or including a particular value within the request), then the synchronized token 130A' was utilized and an alert notification 240 can be generated.

Similar to the deployment of FIG. 2A, the token detection module 204 in FIG. 2B can be implemented within a same device (e.g., server end station) or different device than that which implements the server(s) 212.

Figure 3:
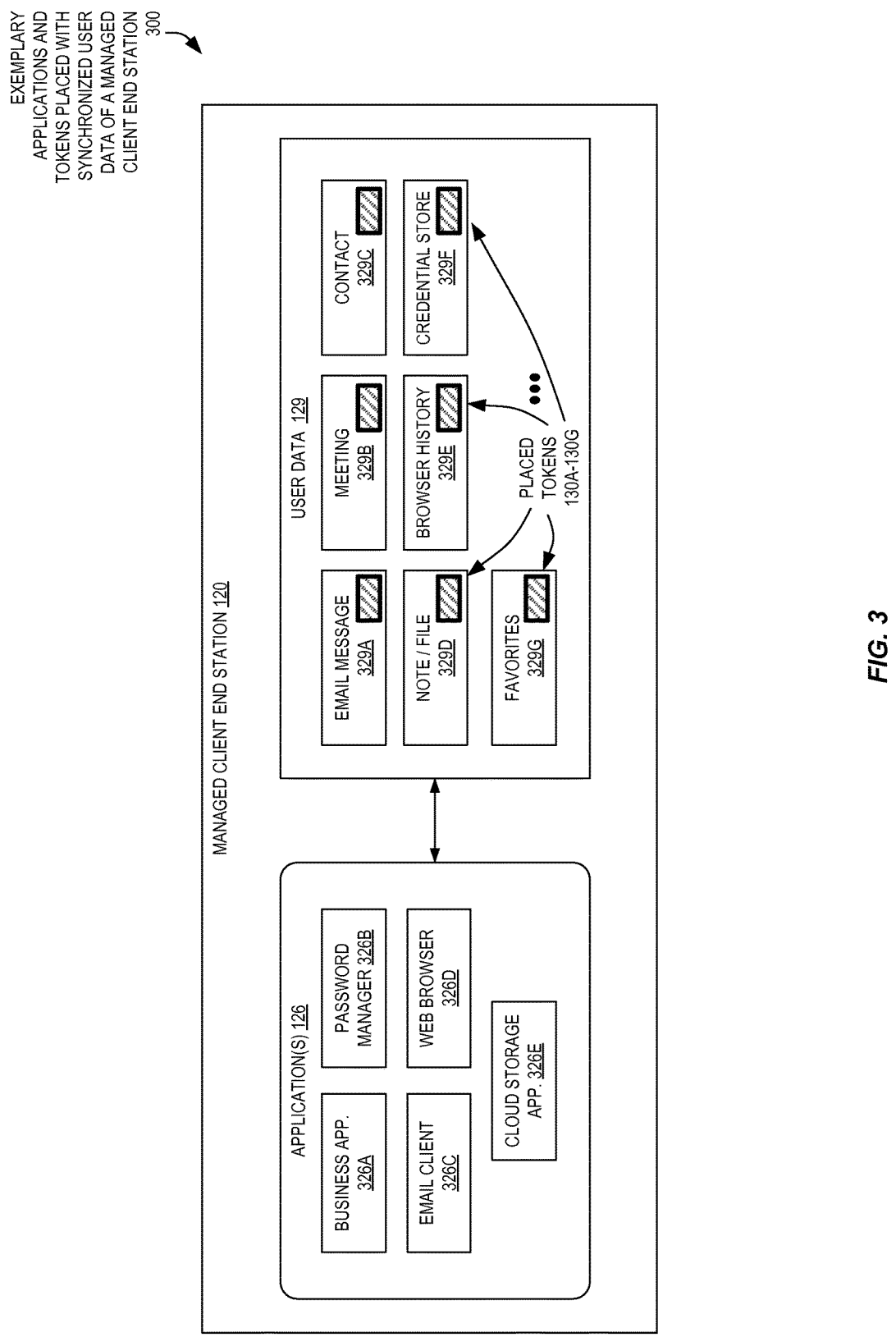
FIG. 3 is a block diagram illustrating exemplary applications and tokens placed with synchronized user data of a managed client end station according to some embodiments.

Having provided an overview of some token system deployments, we now turn to FIG. 3, which is a block diagram 300 illustrating exemplary applications 126 and tokens 130A-130G placed with synchronized user data 129 of a managed client end station 120 according to some embodiments.

As described above, the tokens 130A-130N can be placed in particular locations of managed client end station 120 that are likely to be synchronized, are unlikely for authorized users 116 to detect or use, but remain likely for unauthorized users—e.g., attacker 124—to detect. Accordingly, in some embodiments the tokens 130A-130N are placed with (or within) user data 129 of particular applications 126 that is known to be synchronized.

In FIG. 3, an exemplary managed client end station 120 is depicted that includes multiple applications 126 commonly utilized by authorized users 116 of an enterprise: a business application 326A (including but not limited to groupware software, customer relationship management (CRM) software, project management software, etc.), a password/credential manager application 326B that can help users store and organize passwords (e.g., LastPass™, 1Password™, Keychain™, Dashlane™, etc.), an email client 326C (one type of "communications application") providing for the receipt, composition, and transmission of electronic mail or other messages (e.g., Microsoft Outlook™, Mozilla Thunderbird™, Mail by Apple™), a web browser 326D providing functionality to view web pages and utilize web applications (e.g., Google Chrome™, Mozilla Firefox™, Microsoft Internet Explorer™, Apple's Safari™, Opera™ browser), and a cloud storage application 326E providing users the ability to store data at and/or retrieve data from one or more remote servers (e.g., Google Drive™, Dropbox™, iCloud™, OneDrive™, Box™, etc.). While only a few types of common applications 126 are presented here, many other types of applications 126 exist that utilize synchronization to synchronize user data, which can similarly be used for token placement. Additionally, in various embodiments the managed client end station 120 may have zero, some, or all of these illustrated applications 126.

In some embodiments, authorized users (e.g., 116) can utilize these applications 126 to view, edit, create, and otherwise interact with user data files 129, though in some cases the applications 126 may execute and/or interact with user data files 129 without direct user interaction. However, user data files 129 are files typically used by human users of the managed client end station 120 (or are specific to a human user or users), as opposed to files including object code or source code for applications and/or an operating system of the managed client end station 120. A few examples of user data files 129 include email messages 329A of an email client 326C, meeting objects 329B of a business application 326A, contact objects 329C of a business application 326A or email client 326C, files 329D such as "notes" or other documents (e.g., text files, word processing document files, Portable Document Format (PDF) files, multimedia files, etc.) used by any or all of the applications 126, a browser history 329E listing previously-visited websites of the browser 326D (or, for example, a history of copied/pasted items of a clipboard manager application), a credential store 329F of a password manager 326B or web browser 326D, a list of favorites 329G (or "bookmarks") of a web browser 326D, etc.

In FIG. 3, multiple tokens 130A-130G are illustrated as being placed within the various types of illustrated user data 129. Of course, in various embodiments different numbers of tokens 130A-130G may be placed (e.g., only one, five, twenty-five, etc.), and there may be differing numbers of tokens 130A-130G placed with/within the particular types of user data 129 (e.g., multiple tokens placed within email messages 329A, but no tokens placed as meeting objects 329B, etc.) Accordingly, the illustration of FIG. 3 is simply illustrative of some possible applications 126, user data 129 types, and token 130A-130G placement possibilities.

In some embodiments, a token 130A may be placed within an existing or "legitimate" user data 129 object (e.g., within an existing note/file 329D), and in some embodiments, an entirely new user data 129 object (e.g., a new email message 329A or new note/file 329D) can be created to include the token 130A. Additionally, in some embodiments the token 130A can be encrypted (or placed within an encrypted user data 129 object) using a key selected to allow an attacker to quickly guess the key (e.g., using a well-known key such as "qwerty" or "password" or "1234", etc.) and reveal the token 130A, which can increase the attacker's trust that the token 130A is in fact valuable and that it may provide access to valuable enterprise resources.

These user data objects 329A-329G illustrate a few examples of user data 129 having traits that make them good placement locations for tokens as they satisfy an "optimal token placement criteria"—first, that the data is likely to be synchronized; second, that a token placed with/within this data is not likely to be detected or modified by an authorized user; and third, that a token placed with/within this data is still likely to be detected by a malicious user/attacker.

For example, an email message 329A within an email client 326C can satisfy the optimal token placement criteria as it may be synchronized (e.g., as multiple email clients 326C of multiple devices can be synchronized via a mail server, for example, to present a same view of an email account), a token placed therein is not likely detected by an authorized user (e.g., a token can be placed in an "old" email message, in an email within a "deleted items" folder, etc.), but will still be likely detected by a malicious user (e.g., a malicious user may likely look for "old" emails or through a "deleted items" folder, for example). Similarly, a meeting object 329B can also satisfy the optimal token placement criteria as it may be synchronized via a business application 326A or email client 326C, allow a token placed therein to not be likely detected by an authorized user (e.g., through use of an "old" meeting or "deleted" meeting), but still be detected by a malicious user who may likely look for such "old" or "deleted" meeting objects.

The same can hold true for the other exemplary user data 129 objects. For example, a contact 329C can be synchronized, be hidden "in plain sight" in the midst of many other contacts, yet be found by an attacker. A note or file 329D can be synchronized by a cloud storage application 326E (or operating system component, etc.), be hidden from typical users by being placed in a "deleted items" folder or in a hidden folder, yet be found by an attacker. A browser history 329E also can commonly be synchronized between devices, its large number of entries are not typically closely scrutinized by authorized users, and yet may be examined by an attacker. A credential store 329F also is commonly synchronized between devices, not "browsed" by authorized users, but is commonly browsed by attackers. Additionally, a list of favorites 329G (e.g., bookmarks of favorite URLs in a browser) can be synchronized between devices, not be closely scrutinized by authorized users, but be browsed by attackers.

Of course, other types of user data 129 not illustrated herein can also satisfy the optimal token placement criteria and thus these illustrated types are to be viewed as exemplary.

In some embodiments, one or more of the applications 126, one or more of the user data files 129, and one or more of the tokens 130A-130G may not be actually stored on any persistent storage device (e.g., a flash memory, traditional disk-based storage device) of or attached to the managed client end station 120. For example, the managed client end station 120 could be a "thin client" such as a Chromebook™, Chromebox™, etc., and some or all of these entities can be retrieved by the managed client end station 120 from another device using a set of one or more physical network interfaces. In these embodiments, the tokens 130A-130N are still made available to the managed client end station 120 (e.g., stored in RAM, made easily available to the managed client end station 120A in some other way, etc.) so that they may be discovered by an attacker 124.

Figure 4:
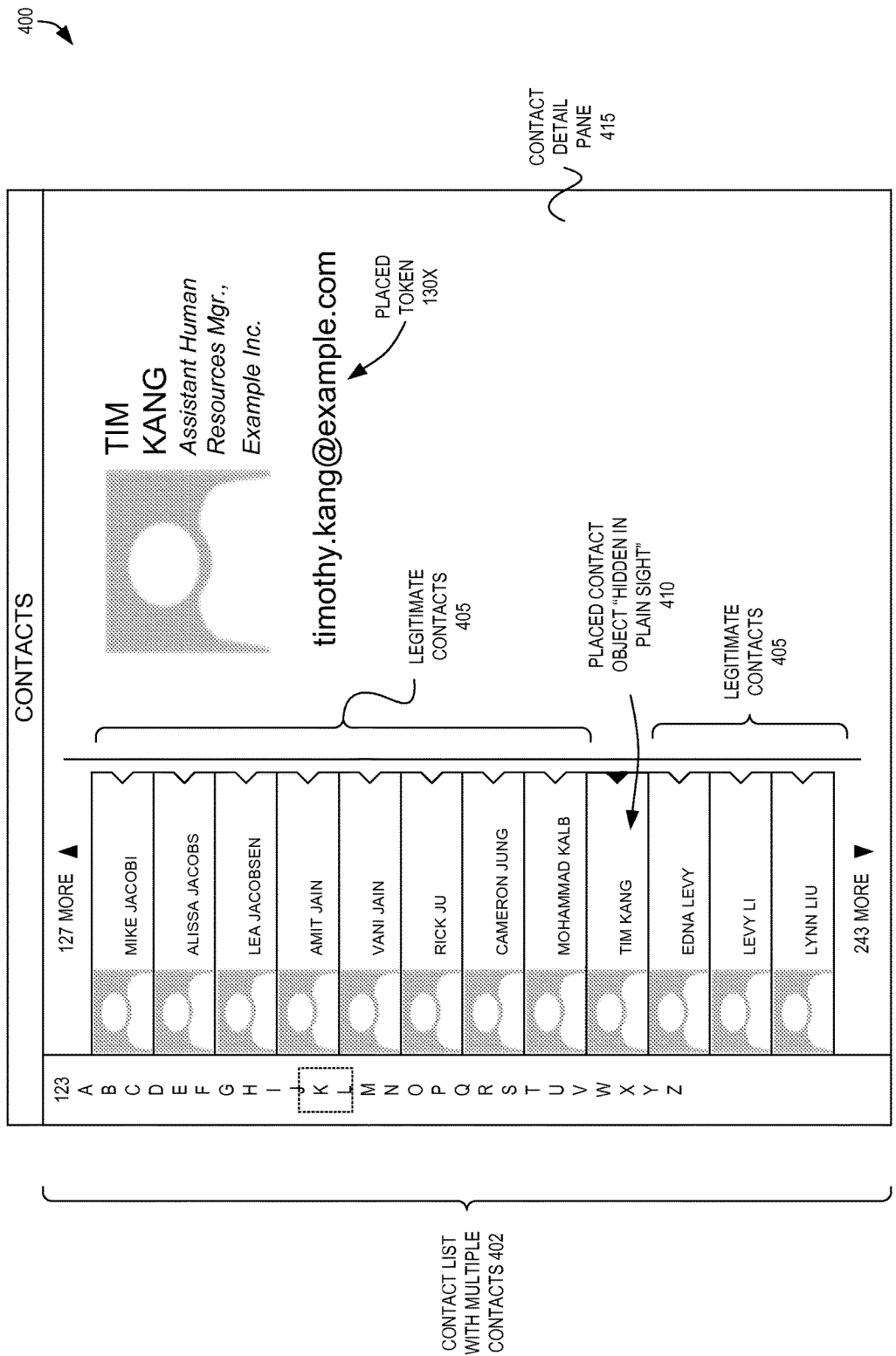
FIG. 4 is an exemplary contacts user interface of a communications application presenting a contact list with multiple contacts including placed contact objects hidden in plain sight according to some embodiments.
Figure 5:
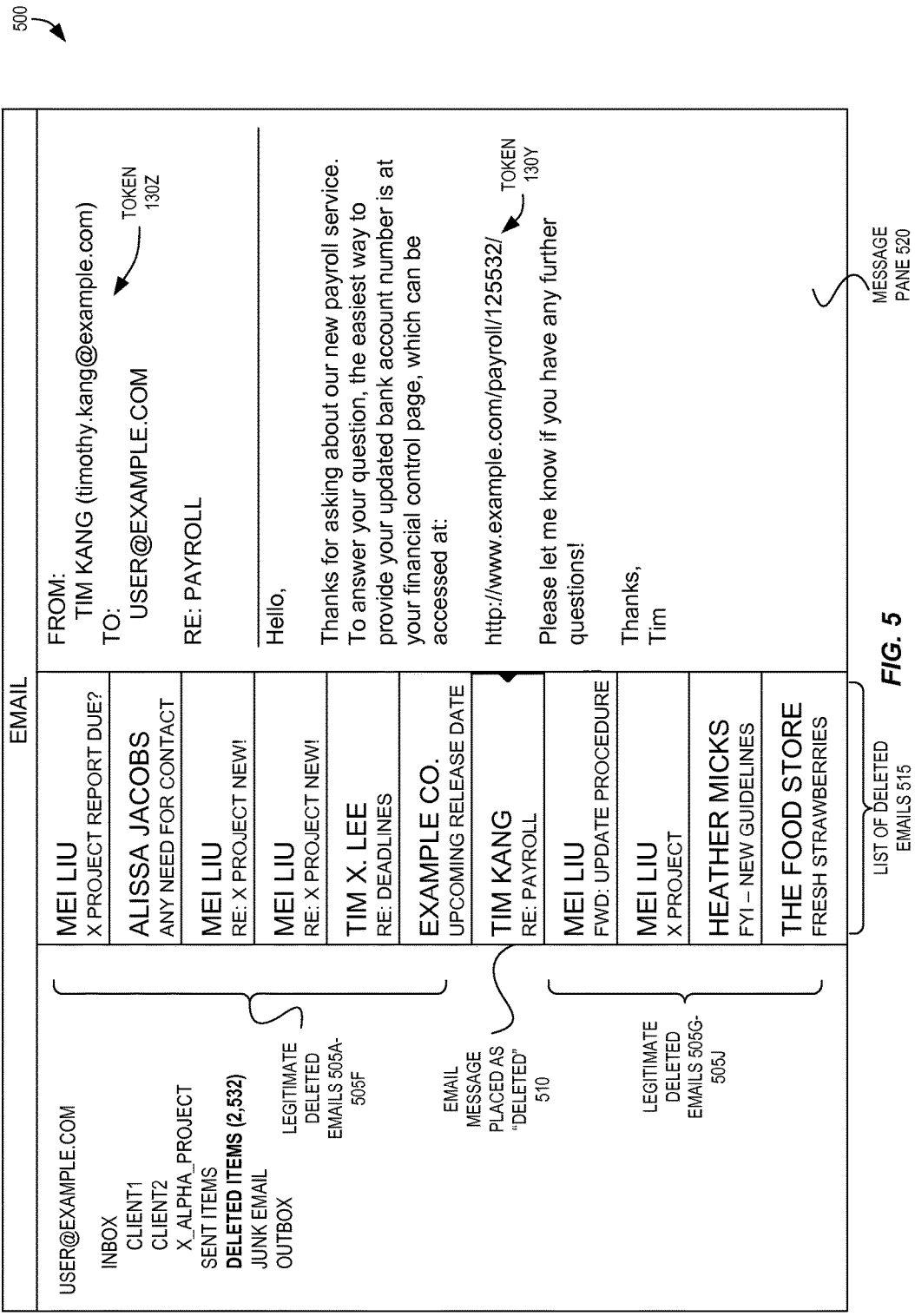
FIG. 5 is an exemplary mailbox user interface of a communications application presenting a list of deleted emails with multiple legitimate email objects including a placed email object with multiple tokens and that is hidden in plain sight according to some embodiments.

Exemplary user data 129 objects will now be presented with regard to FIG. 4 and FIG. 5. FIG. 4 is an exemplary contacts user interface 400 of a communications application (e.g., email client 326C, business application 326A, etc.) presenting a contact list 402 with multiple contacts including a placed contact object 410 "hidden in plain sight" according to some embodiments. In this example, the user interface 400 presents a "contacts" explorer interface including a contact list 402 of multiple contacts that can be selected and a contact detail pane 415 illustrating data associated with a selected contact object 410. In this case, a placed token 130X is an email address placed within a particular contact object 410, which appears to be associated with an enterprise resource (i.e., an email account).

In this example, a user data object (i.e., a contact) is added to a list of contacts, each of which is capable of storing a person's name, title, company/employer, email address, phone number, website, and/or other biographical information. In some cases, software applications utilizing contact lists 402 often allow the lists 402 to be synchronized across multiple devices to allow users the ability to always have access to their contacts regardless of their location or available device.

As described above, the use of contact objects for placing tokens can be useful because contact objects can satisfy the optimal token placement criteria. First, as described, contact lists are often synchronized between devices of users—and particularly for users of large organizations. Next, most authorized users do not "explore" or "browse" the contacts in a contact list, and instead just search for contact information for a particular known person. Thus, the inclusion of an additional contact within such a list 402 is not likely to be found by most users performing normal tasks. Additionally, some organizations configure contact lists 402 of its employees with "general" contacts of the organization, and thus it is normal in some environments for users to have contacts within their contact list that may be unknown to them. Further, many users have a large number of contacts in their list—including, perhaps, contacts for people that the users do not regularly interact with, so a user stumbling across a contact with an unfamiliar name would not arouse much confusion or suspicion. Finally, a malicious user will remain likely to find the placed contact object 410 (especially if it is populated with "attractive" data) and will likely not be able to ascertain that it may not be valid.

In this example, the placed contact object 410 is referred to as being "hidden in plain sight," as it is mixed in with a large number of other legitimate contact objects 405, thus obscuring its existence. Further, the placed contact object 410 is also stored in a location (i.e., a contact list 402) that is not often examined by typical users. However, no other special hiding mechanisms have been utilized in this example.

Similarly, FIG. 5 is an exemplary mailbox user interface 500 of a communications application presenting a list of deleted emails 515 with multiple legitimate email objects 505A-505F including a placed email object 510 having multiple tokens and that is hidden in plain sight according to some embodiments. In this depicted example, an email message object 510 is created in a folder of deleted items, and the email message object 510 (as illustrated in the message pane 520) includes two tokens: an email address token 130Z and a URL token 130Y.

Much like the example of FIG. 4, this example similarly depicts a token placement location that also satisfies the optimal token placement criteria. First, folders of email objects of email applications are often synchronized between devices of users. Additionally, most users do not "explore" or "browse" through deleted email folders, and thus the inclusion of an additional email within such a list of deleted emails 515—especially one with many items—is not likely to be found by most users performing normal tasks. Finally, a malicious user will be likely to find the placed email message object 510 (again, especially if it is populated with "attractive" data) and will likely not be able to ascertain that it may not be valid.

In this example, the placed email message object 510 is again "hidden in plain sight" as it is placed amongst a large number of other legitimate email message objects 505A-505F and 505G-505J, thus obscuring its existence. Further, the placed email message object 510 is also stored in a location (i.e., a list of deleted emails 515) that is not often examined by typical users. However, in this example no other special hiding mechanisms have been utilized.

Having presented a few examples, we now explore a few possible token types and user data placement possibilities 600 as illustrated in FIG. 6. This set of possibilities presents one example configuration—of course, many other user data types 602, token types 604, and user data type to token type pairings are possible in other embodiments. Thus, this example is to be viewed as illustrative.

Each row in the depicted table is a user data type 602 indicating a type of user data object that can be created or modified to include tokens. The user data types 602 include the user data illustrated in FIG. 3.

Each column in the depicted table is a particular type of token 604 that can be created. These illustrated token types include credentials 654 (e.g., a username, password, security key, security question answers, personal contact information, etc.), which can appear to provide access to enterprise resources. Additionally, database metadata 656 is another type of token, and can include a database name, a database hostname, a table name, an attribute/column name, a connection string, query, etc., useful for possible connecting with an apparent enterprise database resource. Databases are well-known targets of many attacks, especially as they can provide sensitive information including but not limited to email addresses, passwords, credit card numbers, address information, social security numbers, etc., which can be used for identity theft, financial fraud, blackmail, etc. Additionally, another token type 604 is a resource identifier 658, which can include a URL/URI, a file system path, a Service Principal Name (SPN), network address, etc., which can identify a particular location of an apparent enterprise resource. Additionally, another illustrated token type 604 is an email address 660 (or portion thereof), which can provide information about potential usernames used within the enterprise network and/or provide another email address for email spam, etc. Of course, many other token types exist that are not illustrated herein, such as HTTP cookies, Quick Response (QR) codes, etc., and thus this example of FIG. 3 is simply illustrative and not exhaustive.

In some embodiments, these tokens can be generated by the token system 102. To generate a token for a particular token type, a set of characteristics for that type are determined. For example, a set of characteristics for a "database username" type may dictate that the token is to be longer than 4 characters in length, shorter than 16 characters in length, and contain only American Standard Code for Information Interchange (ASCII) characters.

As another example, a set of characteristics for a resource identifier of type URL may dictate that the generated token is to include a scheme/protocol name, a colon, two slashes, a host/domain name, optionally a colon and port, and a full path of a resource. The set of characteristics for each type of token may be determined and configured by one of skill in the art, since these values typically have rigid format requirements per formal standard requirements or well-known best practices. Thus, in some embodiments, a random or pseudo-random token can be generated that satisfies the set of characteristics.

In some embodiments, some types of tokens can be generated using another set of rules proscribing requirements for creating "believable" values, as in some cases a random or pseudo-random value would not be believable from the perspective of an attacker. For example, a token of type "password" may have an additional set of rules requiring that, in addition to meeting the set of characteristics for the type, that a word from an English dictionary or a list of common proper nouns must be included in the generated token, as it is known that many passwords in use today tend to include such values.

Additionally, in some embodiments the tokens can be created to imply that the credential pertains to the enterprise. For example, an email address 660 token (or resource identifier token 658) could be created according to logic that sets the domain name portion of the email address (or resource identifier) to a particular domain name used by the enterprise.

In some embodiments, instead of generating the tokens, the token system 102 may retrieve or be provided, via another computing device, a set of tokens 130A-130N to be utilized.

In some embodiments, the token system 102 can also utilize a token candidate filtering module (not illustrated) to further determine whether a received or generated token should be used. The candidate filtering module can include logic and/or data useful to determine whether the use of a particular token would conflict with an actual value used by the enterprise. For example, in some embodiments, the candidate filtering module includes a list of valid values for each type of token that are actually being utilized by the enterprise. For example, the candidate filtering module may maintain a list of names of actual database tables by a database server of the enterprise, and then remove any generated/received tokens from consideration that match any actual database table name in the list. Accordingly, in some embodiments the candidate filtering module is configured to, in real-time or periodically via a batch operation, send requests to one or more computing devices and/or servers of the enterprise to acquire the list of valid values for the one or more utilized token types.

Turning back to the illustrated table, the first row of data indicates that an email message object 329A can be well-suited to store credentials 654 (e.g., within a text body of an email, which appear to provide access to a server or other resource), database metadata 656 (e.g., within a text body of an email), a resource identifier 658 (e.g., within a text body of an email, which could identify an enterprise resource such as a shared file hosted by a cloud-storage provider, or identify a site to generate a security token, etc.), and an email address 660 (e.g., within a "to", "from", "cc:", etc., field of an email). Two of these token types are illustrated in FIG. 5—an email address 660 of "timothy.kang@example.com" and a resource identifier 658 of "http://www.example.com/payroll/125532/".

The same holds true for a meeting object 329B, which can be well-suited to store credentials 654 (e.g., a username and/or password for an online meeting), database metadata 656, resource identifiers 658, and email addresses 660. The tokens can be stored in a variety of locations of different types of meeting objects 329B, such as within a "notes" section of the meeting object, within a "invitee" section of the meeting object, within a "subject" section of the meeting object, etc.

A contact object 329C, in the depicted embodiment, is marked as well-suited for placing an email address 660 token. For example, FIG. 4 illustrates how an email address 660 placed token 130X can be part of a contact, such as within an "email address" field of a contact object data structure. The email address could be for a valid or invalid account of the enterprise, thereby allowing detection of the use of the token directly within the enterprise. Additionally, the email address could be of an account of a separate entity, where the account could then be monitored or configured to forward its messages back to the enterprise, for example, to allow for the detection of the use of the account.

Much like the meeting object, a note/file object 329D is similarly well-suited to store credentials 654, database metadata 656, resource identifiers 658, and email addresses 660. Of course, a note or file 329D can be of a variety of types (e.g., text, document, multimedia, etc.) and can store a variety of types of tokens in a variety of places, including within file metadata.

In contrast, a browser history 329E is illustrated as being suited to store resource identifier 658 tokens. For example, a browser history 329E can include one or more history entries, each including a URL/URI field where a resource identifier 658 token could be placed. Additionally, a credential store 329F—e.g., saved password information of a password manager or saved credential information of a browser application, for example—is illustrated as well-suited for storing credentials 654, resource identifiers 658, and email addresses 660. For example, a credential store entry can include a username for a website (which could be an email address), a password for a website, a URL of a website, etc.

Additionally, a set of favorites 329G—e.g., a list of bookmarks of a web browser application—is illustrated as being suited for storing resource identifiers 658, as each bookmark can typically store an associated URL where a resource identifiers 658 token can be placed.

For more detail involving the possible user data types 602, we now turn to FIG. 7, which illustrates some user data types and placement possibilities 700 according to some embodiments. The rows of this table are similar to the columns of FIG. 6, as they illustrate some exemplary user data types 602; however, the columns of the table illustrate some placement locations/strategies for placing user data including one or more tokens.

For example, one placement strategy includes placing a user data object within a "trash" or marking the object as deleted 750. For example, some cloud storage applications, operating systems, etc., include a "trash" folder/object/icon where files can be placed to be deleted, or allow users to otherwise designate or "mark" an object for deletion. Most typical, authorized users do not closely scrutinize the contents of such a location, while attackers often do.

Another placement strategy involves hiding a user data "in plain sight" 752. In some environments, a large number of similar user data objects may be utilized together such that an attempt to view/browse or otherwise navigate through these user data objects involves examining a very large list or collection. Accordingly, with overwhelming numbers of user data objects, users will typically "skim" through the user data objects or instead directly search for a desired user data object using a query. Thus, in some embodiments, a user data object with one or more tokens can be placed in the midst of other similar user data objects without a resulting risk of an authorized user detecting its existence.

One technique for hiding tokens in plain sight can involve creating or modifying a user data object that is to include a token to have a relatively "old" associated date or time (i.e., compared to a current date or time). For example, a meeting object 329B could be created having a date approximately six months prior to a current date. Since typical, authorized users do not look very far backward in a calendar of meeting objects, this placement location avoids detection by authorized users, while preserving a relatively high likelihood of detection by an attacker. Placing a user data object with an "old" date and/or time 754 can be viewed as a subset of hiding user data objects in plain sight 752 because, aside from setting a particular date/time value for the user data object, it need not be modified or altered in any other peculiar way and can still be surrounded by other, legitimate user data objects.

Another placement strategy involves placing a user data object with one or more tokens within a hidden folder 756 or by otherwise setting a file (or data) attribute of the user data object to "hide" the user data object from a typical user.

In this illustrated table, both email messages 329A and meeting objects 329B are indicated as being well-suited for being placed in a trash 750 or deleted (e.g., placed in a "deleted items" folder), being hidden in plain sight 752 (including, potentially, using an old date/time 754), and/or being placed in a hidden folder 756 that could be specifically created to store the message.

In contrast, a contact object 329C is not marked as well-suited for using an "old" date/time, as contacts typically do not have a concept of a date or time. However a contact object 329C is marked for being placed in a trash 750, hidden in plain sight 752, and/or being placed in a hidden folder 756. As it is common for users to have contacts in their account that they do not readily recall, it is not very alarming for most users to accidentally find a token contact that they don't know. Further, the typical user's reaction to noticing a contact that they do not recall does not include actually using the token (i.e., emailing that contact)—at most, a typical user would simply delete the contact. In the case where a user may delete such a contact, embodiments allow for tokens to be periodically "refreshed" according to a schedule.

Next, a note or file 329D is indicated as being well-suited for placement within a trash 750 or hidden folder 756. In contrast, a browser history 329E is indicated as being well-suited for hiding a user data object with one or more tokens in plain sight 752, and possibly using an old date/time value 754. Additionally, both the credential store 329F and set of favorites 329G are both indicated as being well-suited for hiding user data objects in plain sight 752. The browser history 329E, credential store 329F, and set of favorites 329G could be a part of browser data synchronized by a provider of a web browser to multiple browser instances of potentially multiple user devices utilizing a same account.

Figure 8:
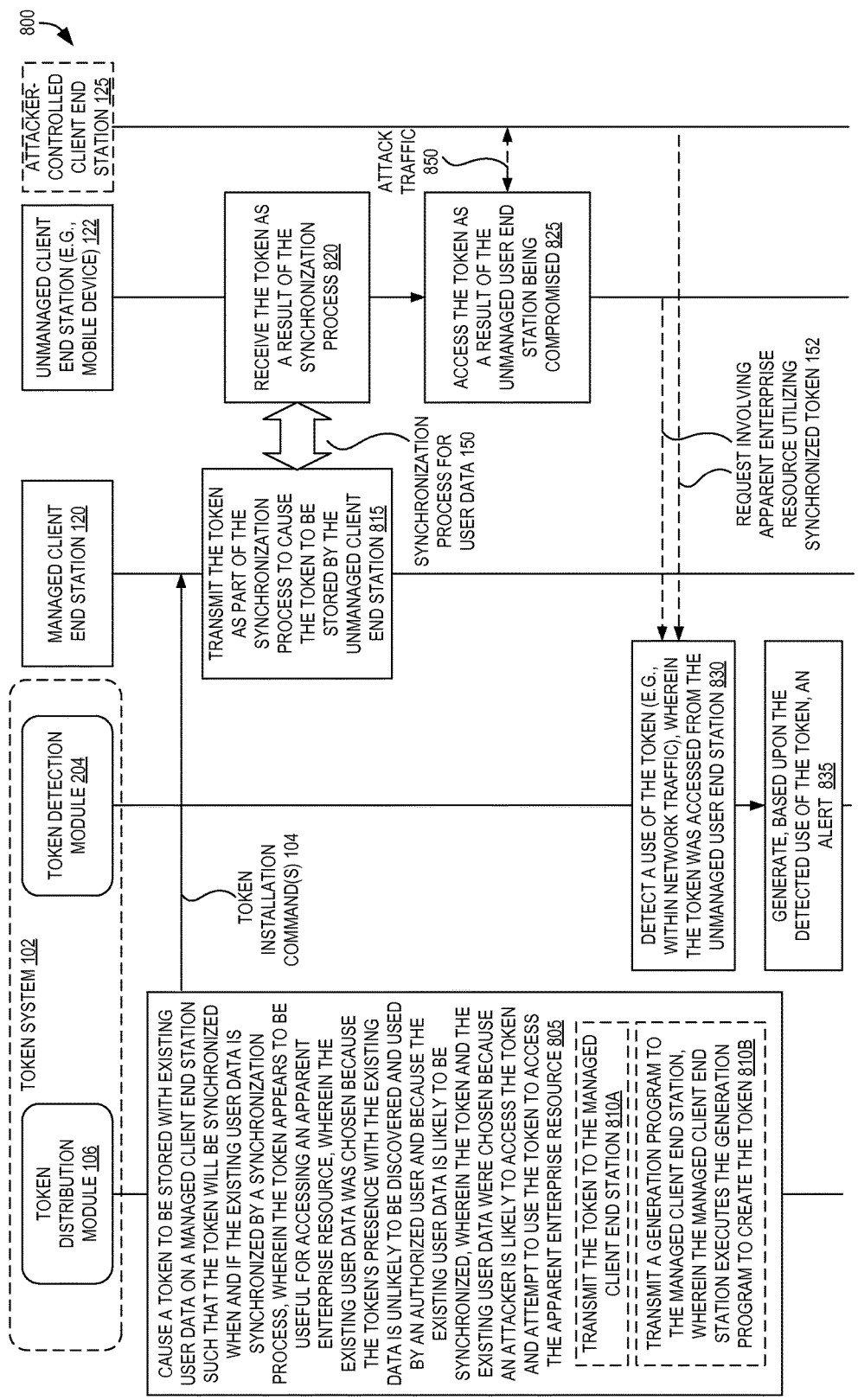
FIG. 8 is a combined sequence and flow diagram illustrating interactions and operations for detecting compromised unmanaged client end stations using synchronized tokens specifically-placed on enterprise-managed client end stations according to some embodiments.

FIG. 8 is a combined sequence and flow diagram 800 illustrating interactions and operations for detecting compromised unmanaged client end stations using synchronized tokens purposefully placed in particular locations on enterprise-managed client end stations according to some embodiments. FIG. 8 includes both a token distribution module 106 and token detection module 204 of the token system 102, as well as the managed client end station 120, unmanaged client end station 122, and optionally (as indicated with dashed lines) an attacker-controlled client end station 125.

At block 805, the token distribution module 106 is configured to cause a token to be stored with existing user data on the managed client end station 120, such that the token will be synchronized when and if the existing user data is synchronized by a synchronization process. This token appears to be useful for accessing an apparent enterprise resource, and the existing user data was chosen because the token's presence with the existing data is unlikely to be discovered and used by an authorized user and because the existing user data is likely to be synchronized. The token and the existing user data were chosen because an attacker is likely to access the token and attempt to use the token to access the apparent enterprise resource.

In some embodiments, block 805 can include block 810A, where the token is transmitted to the managed client end station—such as via token installation command(s) 104.

In some embodiments, block 805 can include block 810B, where a generation program is transmitted to the managed client end station—such as via token installation command(s) 104. As a result, the managed client end station 120 executes the generation program to create and place the token.

After a transmission of the token installation command(s) 104, the managed client end station 120 is configured to, at block 815, transmit the token as part of a synchronization process 150 to cause the token to be stored by the unmanaged client end station 122. This synchronization process 150 can occur using one or more computing devices of a synchronization entity (which possibly could be the enterprise itself), or can occur directly between the managed client end station 120 and unmanaged client end station 122.

Accordingly, at block 820, the unmanaged client end station 122 receives the token as a result of the synchronization process.

At some point, the unmanaged client end station 122 at block 825 accesses the token as a result of the unmanaged user end station being compromised. This can be as a result of attack traffic 850 from an attacker-controlled client end station 125, though it need not be—such as when the unmanaged client end station 122 is compromised with malware. For example, the malware (or instructions of an attacker, sent via attack traffic 850) can search through various user data objects seeking seemingly-valuable information such as credentials, email addresses, resource locations, etc.—which can correspond to one or more of the placed tokens. Thus, the malware/attacker can find at least one of the synchronized tokens, and thus cause the unmanaged client end station 122 to access the token (e.g., load it from a storage medium such as a magnetic disk or flash memory into RAM or a processor register, for example).

Next, either the unmanaged client end station 122 or the attacker-controlled client end station 125 can transmit a request 152 involving an apparent enterprise resource utilizing the synchronized (and accessed, at block 825) token. This request could comprise, for example, an HTTP GET request for a URL, where the URL was a resource identifier token. Alternatively, the request could comprise, for example, a request to access a particular enterprise resource using a username and/or password, where the username and/or password were the accessed token.

Accordingly, at block 830, the token detection module 204 is configured to detect a use of the token (e.g., here, within network traffic) that was accessed from the unmanaged user end station, and, at block 835, generate, based upon the detected use of the token, an alert. The alert can comprise, for example, a message transmitted to a device or account of an enterprise administrator 121, a message sent to cause a record describing the detection to be stored in a database, etc.

Exemplary Deployment Environments

As described herein, components of the token system 102 can be deployed in various configurations for various purposes. For example, FIG. 9 is a block diagram illustrating an exemplary on-premise security gateway deployment 900 of a token detection module 204 according to some embodiments.

Figure 9:
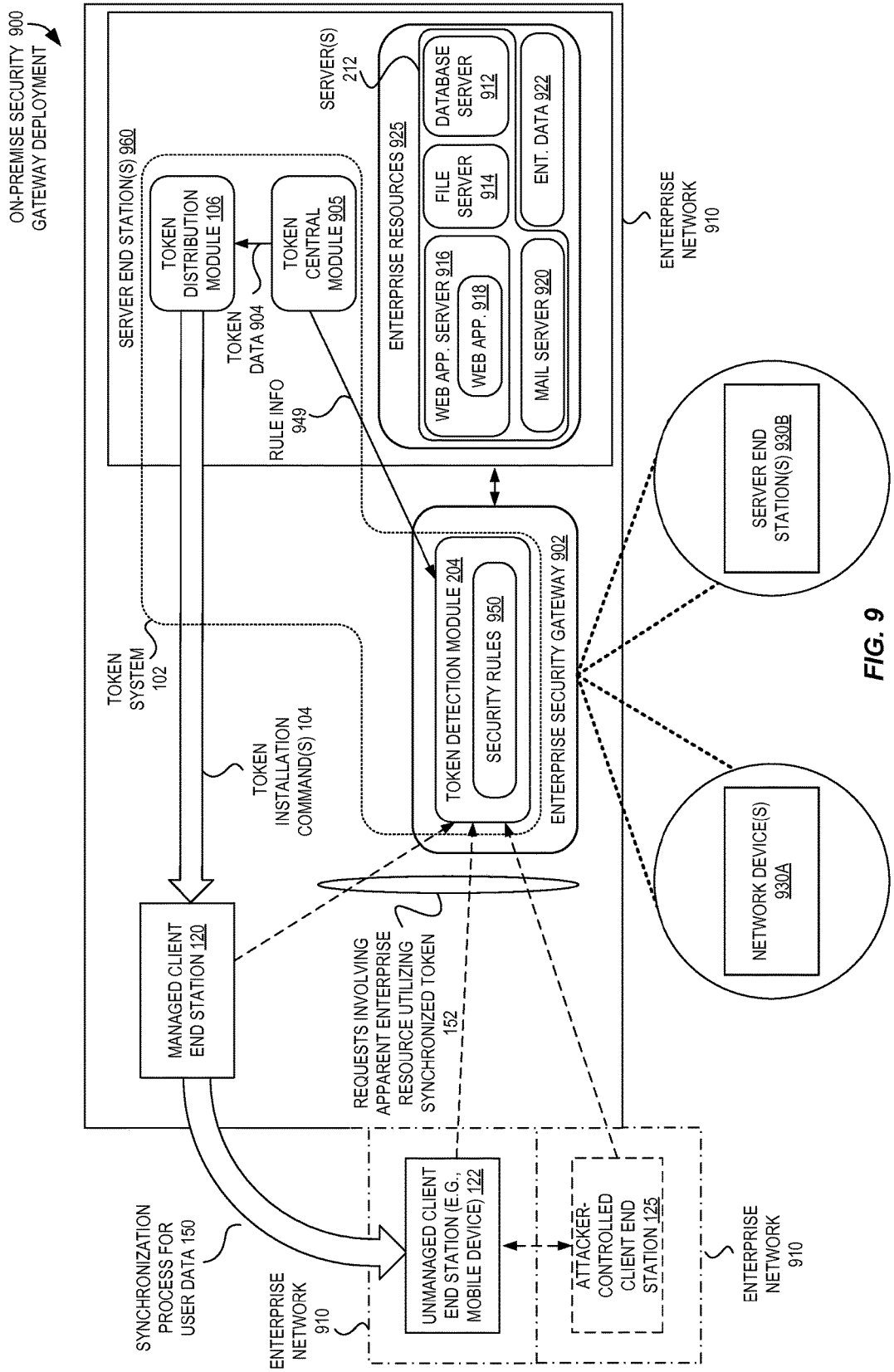
FIG. 9 is a block diagram illustrating an exemplary on-premise security gateway deployment of a token detection module according to some embodiments.

Specifically, FIG. 9 illustrates the token detection module 204 implemented in an enterprise security gateway 902 coupled between enterprise resources 925 and client end stations (e.g., unmanaged client end station 122, possibly an attacker-controlled client end station 125, a managed client end station 120, etc.). Thus, access to the enterprise resources 925 can be thought of as being "protected" by the enterprise security gateway 902, as most (or all) desired interactions with any of the enterprise resources 925 will flow through the enterprise security gateway 902.

Security gateways—such as firewalls, database firewalls, file system firewalls, and web application firewalls (WAFs)—are network security systems that protect software applications (e.g., web application servers 916) executing on electronic devices (e.g., server end stations 960) within a network (e.g., enterprise network 910) by controlling the flow of network traffic passing through the security gateway. By analyzing packets flowing through the security gateway and determining whether those packets should be allowed to continue traveling through the network, the security gateway can prevent malicious traffic from reaching a protected server, modify the malicious traffic, and/or create an alert to trigger another responsive event or notify a user of the detection of the malicious traffic.

In some embodiments, the enterprise security gateway 902 is communicatively coupled between the client end stations (120, 122, 125) and the server end stations 960, such that all traffic (or a defined subset of traffic) destined to the server end stations 960 is first passed through (or made available to) the enterprise security gateway 902 for analysis. In some embodiments, part of the analysis is performed by the token detection module 204 based upon one or more configured security rules 950.

In some embodiments, the enterprise security gateway 902 executes as part of a separate server end station 930B or a (dedicated or shared) network device 930A; but in other embodiments, the enterprise security gateway 902 can operate as part of server end stations 960 (for example, as a software module), or can be implemented using or another type of electronic device and can be software, hardware, or a combination of both.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Security gateways are sometimes deployed as transparent inline bridges, routers, or transparent proxies. A security gateway deployed as a transparent inline bridge, transparent router, or transparent proxy is placed inline between clients (the originating client end station of the request 152) and servers (e.g., server(s) 212) and is "transparent" to both the clients and servers (the clients and the servers are not aware of the IP address of the security gateway, and thus the security gateway is not an apparent endpoint). Thus, packets sent between the clients and the servers will pass through the security gateway (e.g., arrive at the security gateway, be analyzed by the security gateway, and may be blocked or forwarded on to the server when the packets are deemed acceptable by the security gateway).

Additionally, security gateways can also be deployed as a reverse proxy or non-inline sniffer (which may be coupled to a switch or other network device forwarding network traffic between the client end stations (120, 122, 125) and the server end stations 960).

In this depicted embodiment, the enterprise security gateway 902, the enterprise resources 925, and the managed client end station 120 are illustrated as being within an enterprise network 910, which can include one or more LANs. Optionally, one or both of the unmanaged client end station 122 and attacker-controlled client end station 125 can also be within the enterprise network 910, too. Thus, in some embodiments, the enterprise security gateway 902 and the server end stations 960 (providing the enterprise resources 925) operate within a LAN, and some or all of the client end stations (120, 122, 125) can also operate within the LAN or connect to the LAN through a WAN (e.g., the Internet) using a Virtual Private Network (VPN).

Thus the managed client end station 120 and the server end station(s) 960 frequently—but not at all points in time—operate within a same LAN controlled and/or operated by an enterprise. An enterprise is a business, organization, governmental body, or other collective body utilizing or providing content and/or services of the enterprise resources 925. Some users of the managed client end station 120 are deemed enterprise users or authorized users (e.g., authorized user 116), which are those users explicitly or implicitly part of the enterprise. The authorized user 116, using the managed client end station 120, typically access the enterprise resources 925 from within a same LAN as the server end stations 960, or when the managed client end station 120 is connected to the LAN through use of a VPN connection to the LAN overlaid on (e.g., tunneled through) the Internet. However, in some embodiments, one or more of the servers (of the enterprise resources 925 provided by the server end stations 960) can be configured to be directly accessible from outside the LAN.

In FIG. 9, a set of one or more server end stations 960 execute or otherwise implement one or more servers providing the enterprise resources 925. In the embodiment depicted in this figure, the enterprise resources 925 include a database server 912, a file server 914, a web application server 916, and a mail server 920, though in other embodiments the set of server end stations 960 enable other types of servers, including but not limited to print servers, gaming servers, application servers, etc.

A web application server 916 is system software (running on top of an operating system) executed by server hardware (e.g., server end stations 960) upon which web applications (e.g., web application 918) run. Web application servers 916 may include a web server (e.g. Apache, Microsoft® Internet Information Server (IIS), nginx, lighttpd) that delivers web pages (or other content) upon the request of HTTP clients (i.e., software executing on an end station) using the HTTP protocol. Web application servers 916 can also include an application server that executes procedures (i.e., programs, routines, scripts) of a web application 918. Web application servers 916 typically include web server connectors, computer programming language libraries, runtime libraries, database connectors, and/or the administration code needed to deploy, configure, manage, and connect these components. Web applications 918 are computer software applications made up of one or more files including computer code that run on top of web application servers 916 and are written in a language the web application server 916 supports. Web applications 918 are typically designed to interact with HTTP clients by dynamically generating HyperText Markup Language (HTML) and other content responsive to HTTP request messages sent by those HTTP clients. HTTP clients (e.g., non-illustrated software of any of client end stations 120, 122, 125) typically interact with web applications by transmitting HTTP request messages to web application servers 916, which execute portions of web applications 918 and return web application data in the form of HTTP response messages back to the HTTP clients, where the web application data can be rendered using a web browser. Thus, HTTP functions as a request-response protocol in a client-server computing model, where the web application servers 916 typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today. A new version of the HTTP protocol, HTTP/2, is based upon the SPDY protocol and improves how transmitted data is framed and transported between clients and servers.

Database servers 912 are computer programs that provide database services to other computer programs or computers, typically adhering to the client-server model of communication. Many web applications 918 utilize database servers 912 (e.g., relational databases such as PostgreSQL, MySQL, and Oracle, and non-relational databases, also known as NoSQL databases, such as MongoDB, Riak, CouchDB, Apache Cassandra, and HBase) to store information received from HTTP clients and/or information to be displayed to HTTP clients. However, other non-web applications may also utilize database servers 912, including but not limited to accounting software, other business software, or research software. Further, some applications allow for users to perform ad-hoc or defined queries (often using SQL) using the database server 912. Database servers 912 typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column. Thus, in some instances a database server 912 can receive a SQL query from a client (directly from a client process or client end station using a database protocol, or indirectly via a web application server that a client is interacting with), execute the SQL query using data stored in the set of one or more database tables of one or more of the databases, and may potentially return a result (e.g., an indication of success, a value, one or more tuples, etc.).

A file server 914 is system software (e.g., running on top of an operating system, or as part of an operating system itself) typically executed by one or more server end stations 960 (each coupled to or including one or more storage devices) that allows applications or client end stations access to a file-system and/or files (e.g., enterprise data 922), typically allowing for the opening of files, reading of files, writing to files, and/or closing of files over a network. Further, while some file servers 914 provide file-level access to storage, other file servers 914 may provide block-level access to storage. File servers 914 typically operate using any number of remote file-system access protocols, which allow client processes to access and/or manipulate remote files from across the Internet or within a same enterprise network (e.g., a corporate Intranet). Examples of remote file-system access protocols include, but are not limited to, NFS, WebNFS, Server Message Block (SMB)/Common Internet File System (CIFS), FTP, Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

A mail server 920 (or messaging server, message transfer agent, mail relay, etc.) is system software (running on top of an operating system) executed by server hardware (e.g., server end stations 960) that can transfer electronic messages (e.g., electronic mail) from one computing device to another using a client-server application architecture. Many mail servers 920 may implement and utilize the Simple Mail Transfer Protocol (SMTP), and may utilize the Post Office Protocol (POP3) and/or the Internet Message Access Protocol (IMAP), although many proprietary systems also exist. Many mail servers 920 also offer a web interface (e.g., as a web application 918) for reading and sending email.

In some instances as described herein, mail servers 920 can serve as a synchronization entity 140, such as when one or more tokens are placed in an email message. For example, in some embodiments an email message can be created at the managed client end station 120 using an email client 326C (e.g., via a script), and the email client 326C can transmit the email message to the mail server 920, which can then synchronize the email message (as part of the synchronization process 150 for user data) with an email client of the unmanaged client end station 122. Thus, the synchronization process 150 can involve the server end stations 960 of the enterprise, and/or can utilize other server end stations of other entities.

Additionally, FIG. 9 illustrates the token system 102 as including the token detection module 204, the token distribution module 106, and the token central module 905.

In this depicted embodiment, the token distribution module 106 can be executed by a network management server end station (of server end stations 960), which may also execute software to, as part of token installation commands 104, distribute Windows® Active Directory Group Policy Objects (GPO), and/or a Microsoft® System Center Configuration Manager (SCCM) component, and/or an IBM® Tivoli® component, and/or another enterprise end station management software package. Such token installation commands 104 may or may not pass through the enterprise security gateway 902.

The token central module 905 in some embodiments can be executed as part of a management server end station (of server end stations 960), which can update and configure the enterprise security gateway 902 by sending rule information 949 that can update, add, or remove security rules 950 utilized by the enterprise security gateway 902 to, among other security-related tasks, detect the attempted use of tokens to access apparent enterprise resources. In some embodiments, the enterprise security gateway 902 does not receive the rule information 949, but instead has read access to the token central module 905, thereby enabling it to fetch/pull the security rules 950 and/or rule information 949.

Figure 10:
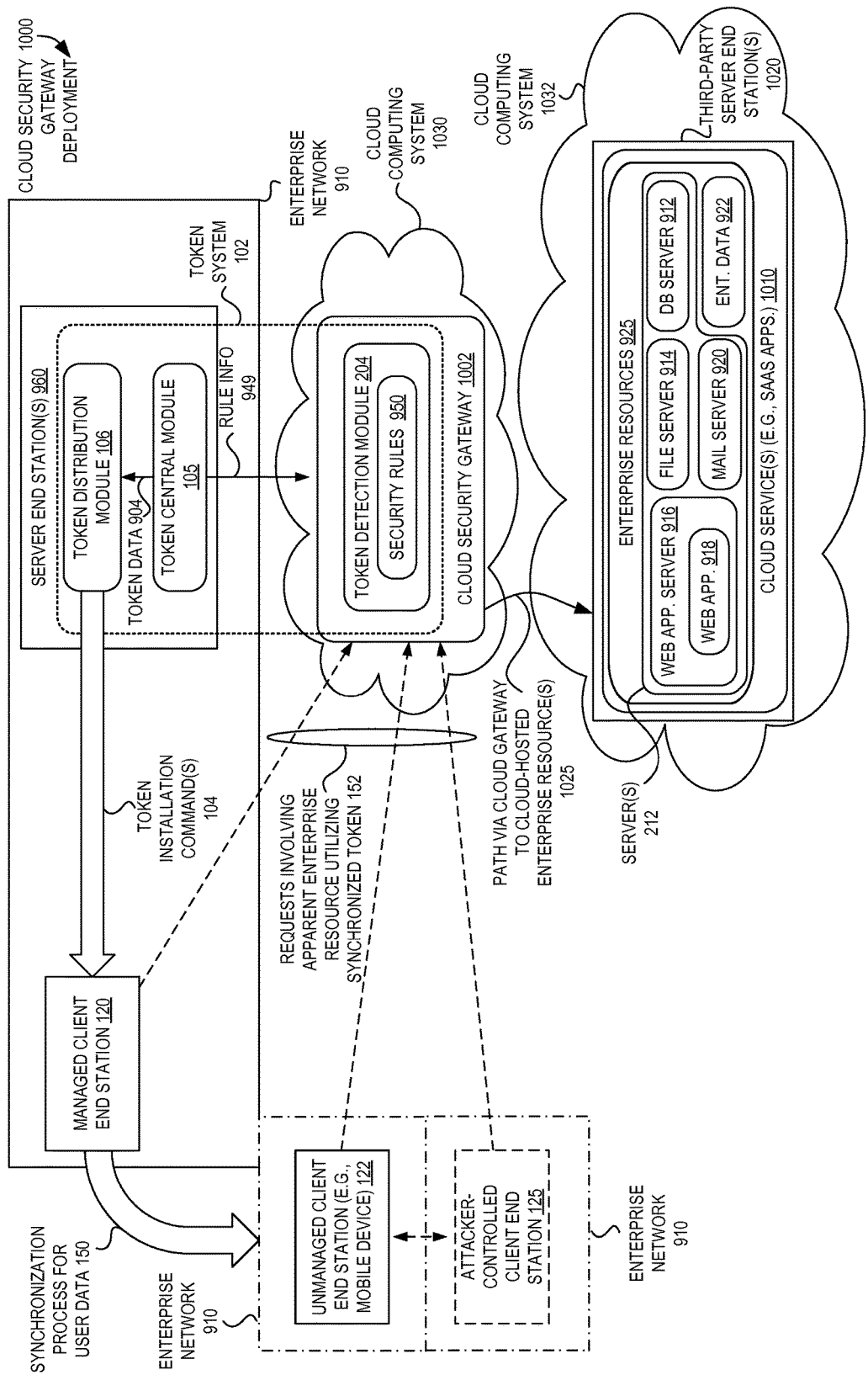
FIG. 10 is a block diagram illustrating an exemplary cloud security gateway deployment of a token detection module according to some embodiments.

Another deployment possibility is illustrated in FIG. 10, which is a block diagram illustrating an exemplary cloud security gateway deployment 1000 of a token detection module according to some embodiments. FIG. 10 again illustrates server end stations 960, a managed client end station 120, and optionally an unmanaged client end station 122 and/or attacker-controlled client end station 125 as within an enterprise network 910. However, in this depicted embodiment, users of the enterprise may access/utilize enterprise resources 925 that are external to the enterprise network 910, and can be provided as cloud services 1010 of one or more third-party server end stations 1020 of, for example, a cloud computing system 1032.

In this example, the enterprise can cause the access to the enterprise resources 925 to be provided through a cloud security gateway 1002 implementing the token detection module 204, which is illustrated as path 1025. One example of a cloud security gateway 1002 is the Imperva™ Skyfence™ Cloud Gateway of Imperva Inc.

The cloud security gateway 1002, in some embodiments, acts as a cloud access security broker that enables enterprises to have visibility and control over sanctioned and/or unsanctioned cloud services 1010 to enable their safe and productive use. In some embodiments, the cloud security gateway 1002 enables enterprises to discover cloud services 1010 used by enterprise users, assess related risks, and enforce controls to prevent account-centric threats, meet compliance requirements, protect enterprise data 922 and enterprise resources 925 in the cloud, etc. Thus, in some embodiments the cloud security gateway 1002 is a cloud-based security policy enforcement point located between cloud service consumers (e.g., managed client end station 120, unmanaged client end station 122, etc.) and cloud service 1010 providers allowing the enterprise to enforce security policies as the cloud-based enterprise resources 925 are accessed. Cloud security gateways 1002 can consolidate many types of security policy enforcement, including but not limited to authentication, authorization, data access reporting, activity monitoring, single sign-on (SSO), security token mapping, encryption, logging, alerting, Application Programming Interface (API) control, etc.

In this example, the cloud security gateway 1002 is illustrated as being within a cloud computing system 1030 that appears distinct from the enterprise network 910 and cloud commuting system 1032 providing the enterprise resources 925. However, in other embodiments the cloud security gateway 1002 can be within the enterprise network 910 or within cloud computing system 1032.

In the depicted cloud security gateway deployment 1000, a client end station (120, 122) can be configured by the enterprise to contact the cloud security gateway 1002 when seeking access to the cloud service(s) 1010, which can occur without the authorized user 116 needing to actively steer traffic to the cloud security gateway 1002. Thus, because the requests 152 involving apparent enterprise resources that utilize a synchronized token will be seen by the cloud security gateway 1002—even though these apparent enterprise resources may be provided by a third-party—the token detection module 204 is still able to analyze the traffic to watch for the use of the synchronized token(s) using security rules 950.

Figure 11:
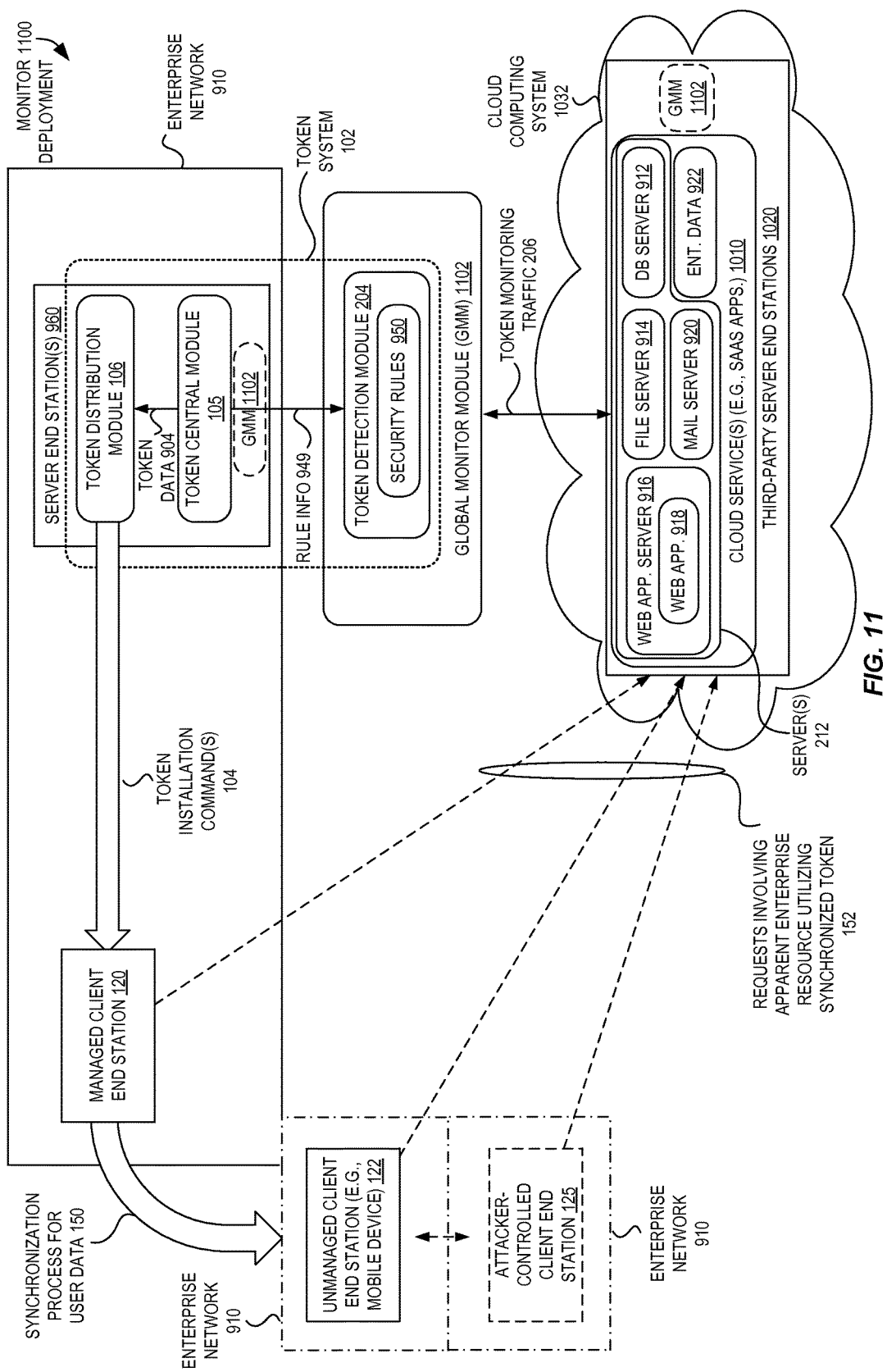
FIG. 11 is a block diagram illustrating an exemplary global monitoring deployment of a token detection module according to some embodiments.

Another deployment possibility is illustrated in FIG. 11, which is a block diagram illustrating an exemplary global monitoring deployment 1100 of a token detection module 204 according to some embodiments. As shown in this example (and in FIG. 2B), the token detection module 204 may not serve as a "choke point" for the traffic carrying requests 152 involving apparent enterprise resources that utilize a synchronized token, and thus the token detection module 204 may not directly see this traffic between the client end stations (120, 122, 125) and the cloud service(s) 1010.

Instead, the token detection module 204 can be implemented in a global monitor module 1102. In this illustration, the global monitor module 1102 is illustrated as not being within the enterprise network 910 or the cloud computing system 1032. For example, the global monitor module 1102 can be deployed in a different set of server end stations located outside of the enterprise network 910 and cloud computing system 1032. However, as shown using dashed lines, in some embodiments the global monitor module 1102 ("GMM") can be deployed in the same one or more server end stations 960 of the enterprise, or can be deployed in the same one or more third-party server end stations 1020 in cloud computing system 1032.

In some embodiments, the global monitor module 1102 can be configured to detect the use of a "stolen" synchronized token (i.e., detect a request 152 involving an apparent enterprise resource that utilizes a synchronized token) by interacting with the cloud service(s) 1010 via token monitoring traffic 206.

As described with regard to FIG. 2B, the token detection module 204 and/or global monitor module 1102 can be configured to "monitor" or "poll" the cloud service(s) 1010 by transmitting requests to the third-party server end stations (or individual servers, such as web application server 916) as part of token monitoring traffic 206 to determine whether the server(s) have received any requests 152 involving apparent enterprise resources that utilize a synchronized token. This monitoring can occur according to a defined schedule, such as checking once every few minutes. Additionally or alternatively, the server(s) can be configured to "report" receipt of some traffic (e.g., requests 152 involving the apparent enterprise resource or involving a synchronized token) to the token detection module 204 of the global monitor module 1102. For example, in some embodiments the server(s) 212 can be configured to transmit reporting data to the token detection module 204 using an API call, SMS message, email message, etc., upon receipt of a request 152.

As one example, in some embodiments an email address token associated with an account hosted by a third-party email provider could be placed in a contact object. The account could be created by the token system 102 (or enterprise administrator 121, etc.), and periodically monitored via token monitoring traffic 206 to determine whether the account received any email messages.

As another example, in some embodiments a resource identifier/URL token associated with a document hosted by a cloud storage provider could be placed on a managed client end station 120, and the token detection module 204 can, as part of token monitoring traffic 206, use an API to retrieve information from the cloud storage provider identifying recent accesses to the particular document.

Accordingly, based upon whatever form or forms of token monitoring traffic 206 are utilized, the token detection module 204 is thus able to gain insight into whether any requests 152 involving synchronized tokens have been made.

Alternative Embodiments

In some embodiments, a single token system 102 can utilize multiple token detection modules 204. For example, in some embodiments multiple token detection modules 204 can be deployed using multiple enterprise security gateways 902 (which can be implemented using separate devices), each providing security for a particular enterprise resource (or set of resources) such as a particular server 212 or group of servers 212. As one example, a first enterprise security gateway 902 (implementing a first token detection module 204) can be deployed to "protect" a first server (e.g., web application server 916), and also a second enterprise security gateway 902 (implementing a second token detection module 204) can be deployed to protect a second server (e.g., database server 912), etc.

In some embodiments utilizing multiple token detection modules in a token system 102, each token detection module 204 can be configured to detect the use of particular tokens based upon the type of enterprise resource 925 it protects. Continuing the example presented above, the first token detection module (protecting a web application server 916) can be configured with particular security rules 950 to watch for the use of tokens applicable to the web application server 916, such as credentials 654 or resource identifiers 658, while the second token detection module (protecting a database server 912) can be configured with security rules 950 to watch for the use of tokens applicable to the database server 912, such as database metadata 656 tokens (e.g., a table name, database name, etc.).

Additionally, in some embodiments, a token system 102 can include multiple token detection modules 204 deployed in different configurations. As one example, a token system 102 can include one or more token detection modules 204 deployed via one or more enterprise security gateways 902 (as illustrated in FIG. 9) together with a token detection module 204 deployed via a global monitor module 1102 (as illustrated in FIG. 11). As another example, a token system 102 can include a detection module 204 deployed via a cloud security gateway 1002 (as illustrated in FIG. 10) together with a token detection module 204 deployed via a global monitor module 1102 (as illustrated in FIG. 11). Accordingly, different token detection module 204 deployments and/or different numbers of token detection module 204 can flexibly be used to implement different token systems 102 specifically tailored to the particular types and locations of enterprise resources 925.

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for causing a token to be placed on an unmanaged client end station without direct access to the unmanaged client end station, wherein a managed client end station that is managed by an administrator of an enterprise has stored therein existing code and existing user data, wherein the existing code is configured to allow participation in a synchronization process of the existing user data, and wherein the synchronization process causes that existing user data to be synchronized with existing user data on the unmanaged client end station, the method comprising:
   causing the token to be stored with the existing user data on the managed client end station such that the token will be synchronized when and if the existing user data is synchronized by the synchronization process, wherein the token appears to be useful for accessing an apparent enterprise resource, wherein the existing user data was chosen because the token's presence with the existing user data is unlikely to be discovered and used by an authorized user and because the existing user data is likely to be synchronized, wherein the token and the existing user data were chosen because an attacker is likely to access the token and attempt to use the token to access the apparent enterprise resource;
   transmitting, by the managed client end station, the token as part of the synchronization process to cause the token to be stored by the unmanaged client end station;
   detecting a use of the token within network traffic, wherein the token was accessed from the unmanaged client end station; and
   in response to the detected use of the token, generating an alert.

2. The method of claim 1, further comprising:
   receiving the token at the unmanaged client end station as a result of the synchronization process; and
   accessing, by the unmanaged client end station, the token as a result of the unmanaged client end station being compromised.

3. The method of claim 1, wherein the token is placed within an email message that is within a deleted email messages folder or marked as deleted within a communications application.

4. The method of claim 1, wherein the token is placed within a hidden folder.

5. The method of claim 1, wherein the token is placed within a contact object operable for use with a communications application among a plurality of other contact objects.

6. The method of claim 1, wherein the token is placed within a note or file stored within a trash object utilized by a cloud storage application.

7. The method of claim 1, wherein the token is placed with the existing user data on the managed client end station in an encrypted format, and wherein the detected token is in a decrypted format.

8. The method of claim 1, wherein the detecting the use of the token within network traffic comprises:
   analyzing a request to access the apparent enterprise resource that includes the token, wherein the apparent enterprise resource is a server application.

9. The method of claim 1, wherein the transmitting, by the managed client end station, the token as part of the synchronization process comprises transmitting the token to a third party server end station which transmits the token to the unmanaged client end station.

10. The method of claim 1, wherein:
    the managed client end station is within an enterprise network when the token is caused to be placed with the existing user data on the managed client end station; and
    the unmanaged client end station is outside of the enterprise network when the token is transmitted as part of the synchronization process to cause the token to be placed by the unmanaged client end station.

11. A system for causing a token to be placed on an unmanaged client end station without direct access to the unmanaged client end station, wherein a managed client end station that is managed by an administrator of an enterprise has stored therein existing code and existing user data, wherein the existing code is configured to allow participation in a synchronization process of the existing user data, and wherein the synchronization process causes that existing user data to be synchronized with existing user data on the unmanaged client end station, the system comprising:
    a token distribution module that causes the token to be placed with the existing user data on the managed client end station such that the token will be synchronized when and if the existing user data is synchronized by the synchronization process, wherein the token appears to be useful for accessing an apparent enterprise resource, wherein the existing user data was chosen because the token's presence with the existing user data is unlikely to be discovered and used by an authorized user and because the existing user data is likely to be synchronized, wherein the token and the existing user data were chosen because an attacker is likely to access the token and attempt to use the token to access the apparent enterprise resource;
    the managed client end station, which transmits the token as part of the synchronization process to cause the token to be stored by the unmanaged client end station; and
    a token detection module that:
       detects a use of the token within network traffic, wherein the token was accessed from the unmanaged client end station; and
       in response to the detected use of the token, generates an alert.

12. The system of claim 11, further comprising the unmanaged client end station that:
    receives the token as a result of the synchronization process; and
    accesses the token as a result of the unmanaged client end station being compromised.

13. The system of claim 11, wherein the token is placed within an email message that is within a deleted email messages folder or marked as deleted within a communications application.

14. The system of claim 11, wherein the token is either:
- placed within a contact object operable for use with a communications application among a plurality of other contact objects; or
- placed within a note or file placed within a trash object utilized by a cloud storage application.

15. A set of one or more non-transitory computer readable storage media storing instructions which, when executed by one or more processors of one or more computing devices, cause the one or more computing devices to perform operations for causing a token to be placed on an unmanaged client end station without direct access to the unmanaged client end station, wherein a managed client end station that is managed by an administrator of an enterprise has stored therein existing code and existing user data, wherein the existing code is configured to allow participation in a synchronization process of the existing user data, and wherein the synchronization process causes that existing user data to be synchronized with existing user data on the unmanaged client end station, the operations comprising:
- causing a token to be placed with the existing user data on the managed client end station such that the token will be synchronized when and if the existing user data is synchronized by the synchronization process, wherein the token appears to be useful for accessing an apparent enterprise resource, wherein the existing user data was chosen because the token's presence with the existing user data is unlikely to be discovered and used by an authorized user and because the existing user data is likely to be synchronized, wherein the token and the existing user data were chosen because an attacker is likely to access the token and attempt to use the token to access the apparent enterprise resource;
- transmitting, by the managed client end station, the token as part of the synchronization process to cause the token to be stored by the unmanaged client end station;
- detecting a use of the token within network traffic, wherein the token was accessed from the unmanaged client end station; and
- in response to the detected use of the token, generating an alert.

16. The set of non-transitory computer readable storage media of claim 15, wherein the operations further comprise:
- receiving the token at the unmanaged client end station as a result of the synchronization process; and
- accessing, by the unmanaged client end station, the token as a result of the unmanaged client end station being compromised.

17. The set of non-transitory computer readable storage media of claim 15, wherein the token is placed within:
- an email message that is within a deleted email messages folder or marked as deleted within a communications application;
- a hidden folder;
- a contact object operable for use with the communications application among a plurality of other contact objects; or
- a note or file stored within a trash object utilized by a cloud storage application.

18. The set of non-transitory computer readable storage media of claim 15, wherein the token is placed with the existing user data on the managed client end station in an encrypted format, and wherein the detected token is in a decrypted format.

19. The set of non-transitory computer readable storage media of claim 15, wherein the transmitting, by the managed client end station, the token as part of the synchronization process comprises transmitting the token to a third party server end station which transmits the token to the unmanaged client end station.

20. The set of non-transitory computer readable storage media of claim 15, wherein:
- the managed client end station is within an enterprise network when the token is caused to be placed with the existing user data on the managed client end station; and
- the unmanaged client end station is outside of the enterprise network when the token is transmitted as part of the synchronization process to cause the token to be stored by the unmanaged client end station.

* * * * *